United States Patent
Westlake

(10) Patent No.: US 12,544,001 B2
(45) Date of Patent: Feb. 10, 2026

(54) MODULAR SYSTEM AND METHOD FOR TESTING BALANCE

(71) Applicant: University Of Maryland, Baltimore, Baltimore, MD (US)

(72) Inventor: Kelly P. Westlake, Ellicott City, MD (US)

(73) Assignee: University Of Maryland, Baltimore, Baltimore, MD (US)

( * ) Notice: Subject to any disclaimer, the term of this patent is extended or adjusted under 35 U.S.C. 154(b) by 496 days.

(21) Appl. No.: 18/193,533

(22) Filed: Mar. 30, 2023

(65) Prior Publication Data

US 2023/0320650 A1   Oct. 12, 2023

Related U.S. Application Data

(60) Provisional application No. 63/325,310, filed on Mar. 30, 2022.

(51) Int. Cl.
| | | |
|---|---|---|
| A61B 5/00 | (2006.01) | |
| A61B 5/11 | (2006.01) | |
| A63B 22/16 | (2006.01) | |

(52) U.S. Cl.
CPC .......... *A61B 5/4023* (2013.01); *A61B 5/1128* (2013.01); *A61B 5/6802* (2013.01); *A63B 22/16* (2013.01)

(58) Field of Classification Search
CPC ... A61B 5/4023; A61B 5/1128; A61B 5/6802; A61B 5/1114; A61B 2562/0252;
(Continued)

(56) References Cited

U.S. PATENT DOCUMENTS

| 5,052,406 A | 10/1991 | Nashner |
|---|---|---|
| 5,209,240 A | 5/1993 | Jain et al. |

(Continued)

FOREIGN PATENT DOCUMENTS

| DE | 102012017219 A1 | 7/2013 |
|---|---|---|
| JP | 2019-071986 A | 5/2019 |

OTHER PUBLICATIONS

Adkin, AL., et al., "Postural control is scaled to level of postural threat", Gait & Posture, vol. 12, No. 2, 2000, pp. 87-93.
(Continued)

*Primary Examiner* — Sundhara M Ganesan
(74) *Attorney, Agent, or Firm* — Wolter Van Dyke Davis, PLLC; Eugene J. Molinelli; Cian G. O'Brien

(57) ABSTRACT

A method and apparatus for testing balance of a subject is provided. The apparatus includes a plurality of modules detachably coupled together to form a walkway. Each module includes an obstacle. The obstacle of one of the modules is a movable obstacle configured to move from a first position to a second position. The obstacle of one of the modules is a fixed obstacle in a fixed position. A system is also provided that includes the apparatus of the first set of embodiments. The system also includes a sensor configured to measure a value of a parameter indicating a characteristic of motion of a subject over the walkway. A method is also provided that includes detachably coupling the plurality of modules together to form the walkway. The method further includes measuring the parameter value indicating the response of the subject to each obstacle of each module along the walkway.

20 Claims, 11 Drawing Sheets

(58) Field of Classification Search
CPC ... A61B 5/0077; A63B 22/16; A63B 2210/50; A63B 24/0075; A63B 2024/0025; A63B 2220/51; A63B 2220/806; A63B 2220/807; A63B 2225/50; A63B 26/003
See application file for complete search history.

(56) References Cited

U.S. PATENT DOCUMENTS

| | | | |
|---|---|---|---|
| 7,980,856 B2 | 7/2011 | Grabiner et al. | |
| 8,012,067 B2 | 9/2011 | Joannou | |
| 8,622,747 B2 | 1/2014 | Chu et al. | |
| 8,968,161 B2 | 3/2015 | Shapiro et al. | |
| 9,526,946 B1* | 12/2016 | Zets | G09B 19/0038 |
| 10,244,990 B2* | 4/2019 | Hu | A61B 5/112 |
| 10,335,091 B2* | 7/2019 | Cole | A61B 5/7267 |
| 11,305,152 B2 | 4/2022 | Alothmany et al. | |
| 12,161,477 B1* | 12/2024 | Berme | A61B 5/4023 |
| 12,204,098 B1* | 1/2025 | Berme | A61B 5/1036 |
| 2007/0184953 A1 | 8/2007 | Luberski et al. | |
| 2008/0288110 A1* | 11/2008 | Leisenring | B01D 53/9495 700/271 |
| 2015/0238816 A1* | 8/2015 | Naderer | A63B 24/0062 482/4 |
| 2015/0374264 A1* | 12/2015 | Haas | A61B 5/1113 73/862.541 |
| 2017/0128816 A1* | 5/2017 | DeMarch | G09B 19/003 |
| 2019/0066844 A1* | 2/2019 | Jin | A61B 5/4023 |
| 2021/0161430 A1* | 6/2021 | Mirelman | A61B 5/112 |

OTHER PUBLICATIONS

Allum, J. H. J., et al., "Review of first trial responses in balance control: Influence of vestibular loss and Parkinson's disease", Human Movement Science, vol. 30, No. 2, 2011, pp. 279-295.
Bhala, R. P., et al., "Ptophobia: Phobic Fear of Falling and Its Clinical Management Get access Arrow", Physical Therapy, vol. 62, No. 2, 1982, pp. 187-190.
Bisdrofff A.R., et al., "EMGresponses to Sudden Onset Free Fall", Acta Otolaryngol. Suppl. 520, 1995, pp. 347-349.
Cona, G, et al., "Age-related decline in attentional shifting: Evidence from ERPs.", Neurosci Lett., vol. 556, 2013, pp. 129-134.
Delbaere, K., et al., "Determinants of disparities between perceived and physiological risk of falling among elderly people: cohort study", BMJ , vol. 341, 2010.
Delbeare, K., et al., "Fear-related avoidance of activities, falls and physical frailty. A prospective community-based cohort study", Age and Ageing, vol. 33, No. 4, 2004, pp. 368-373.
Delbeare, K., et al., "The Falls Efficacy Scale International (Fes-I). A comprehensive longitudinal validation study", Age and Ageing, vol. 39, No. 2, 2010, pp. 210-216. doi:10.1093/ageing/afp225.

King, E. C., et al., "Does the "eyes lead the hand" principle apply to reach-to-grasp movements evoked by unexpected balance perturbations?", Hum Mov Sci. vol. 30 No. 2, 2011, pp. 368-383.
Kumar, A., et al., "Exercise for reducing fear of falling in older people living in the community: Cochrane systematic review and meta-analysis.", Age and Ageing. vol. 45, No. 3, 2016, pp. 345-352.
Lach, H. W., et al., "Incidence and Risk Factors for Developing Fear of Falling in Older Adults", Public Health Nurs., vol. 22, No. 1, 2005, pp. 45-52.
Madehkhaksar, F., et al., "The effects of unexpected mechanical perturbations during treadmill walking on spatiotemporal gait parameters, and the dynamic stability measures by which to quantify postural response.", PLoS One. vol. 13, No. 4, 2018, 15 pages.
Maki, BE, "Gait changes in older adults: predictors of falls or indicators of fear.", J Am Geriatr Soc. Vol. 45, No. 3, 1997, pp. 313-320.
McLlory, W. C., et al., "Early activation of arm muscles follows external perturbation of upright stance", Neuroscience Letters, vol. 184, No. 3, 1995, pp. 177-180.
Murphy, SL., et al., "Characteristics Associated with Fear of Falling and Activity Restriction in Community-Living Older Persons", J Am Geriatr Soc., vol. 50, No. 3, 2002, pp. 16-520.
Perry SD, et al., "The Role of Plantar Cutaneous Mechanoreceptors in the Control of Compensatory Stepping Reactions Evoked by Unpredictable, Multi-Directional Perturbatio", Brain research, 877, 2000, pp. 401-406.
Sanders, O., et al., "Aging changes in protective balance and startle responses to sudden drop-perturbations.", J Neurophysiol., vol. 122, 2019, pp. 39-50.
Schooten, KS. V., et al., "Concern About Falling Is Associated With Gait Speed, Independently From Physical and Cognitive Function ", Physical Therapy, vol. 99, No. 8, 2019, pp. 989-997.
Uemura, K., et al., "Fear of falling is associated with prolonged anticipatory postural adjustment during gait initiation under dual-task conditions in older adults.", Gait Posture. Vol. 35, No. 2, 2012, pp. 282-286.
Wang, Y., et al., "Can treadmill-slip perturbation training reduce immediate risk of over-ground-slip induced fall among community-dwelling older adults?", J Biomech., vol. 84, 2019, pp. 58-66.
Westlake, K. P., et al., "Influence of nonspatial working memory demands on reach-grasp responses to loss of balance: Effects of age and fall risk", Gait Posture., vol. 15, 2016, pp. 51-55.
Westlake, K.P., et al., "Sensory-specific balance training in older adults: Effect on proprioceptive reintegration and cognitive demands. ", Phys Ther., vol. 87, No. 10, 2007.
Winter, D. A., et al., "Biomechanical Walking Pattern Changes in the Fit and Healthy Elderly", Phys Ther. vol. 70, No. 6, 1990, pp. 340-347.
Yang, P., et al., "Automatic recognition of falls in gait-slip training: Harness load cell based criteria.", J Biomech., vol. 44, 2011, pp. 2243-2249.

* cited by examiner

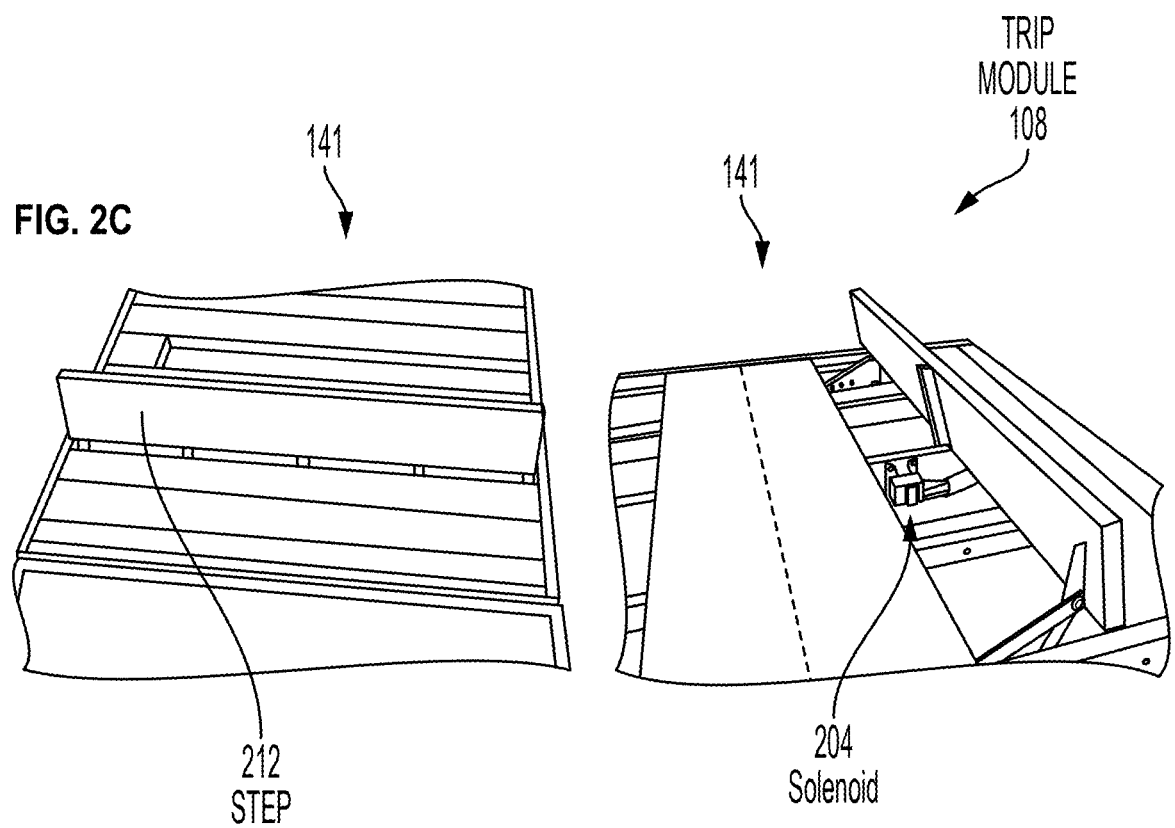

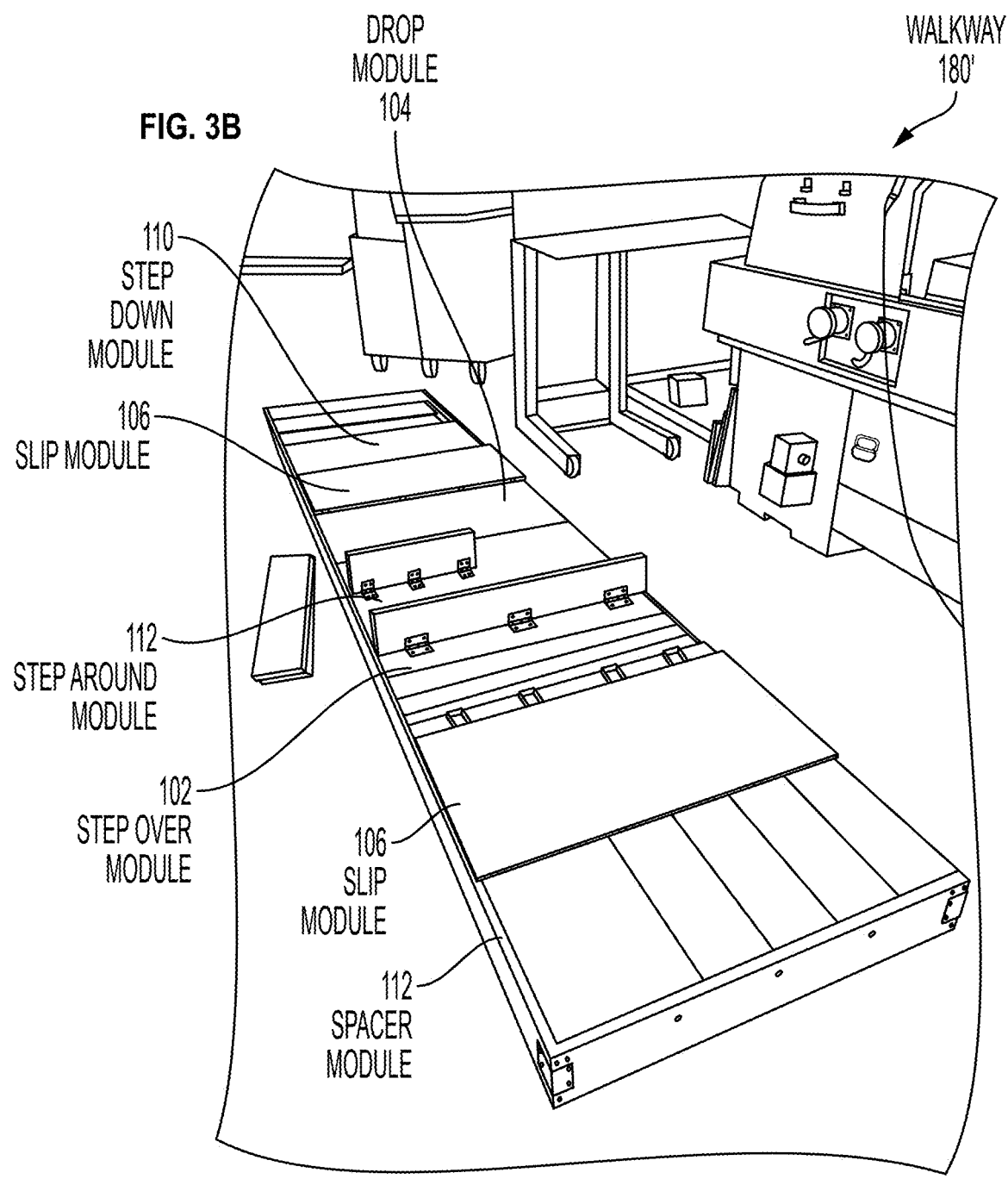

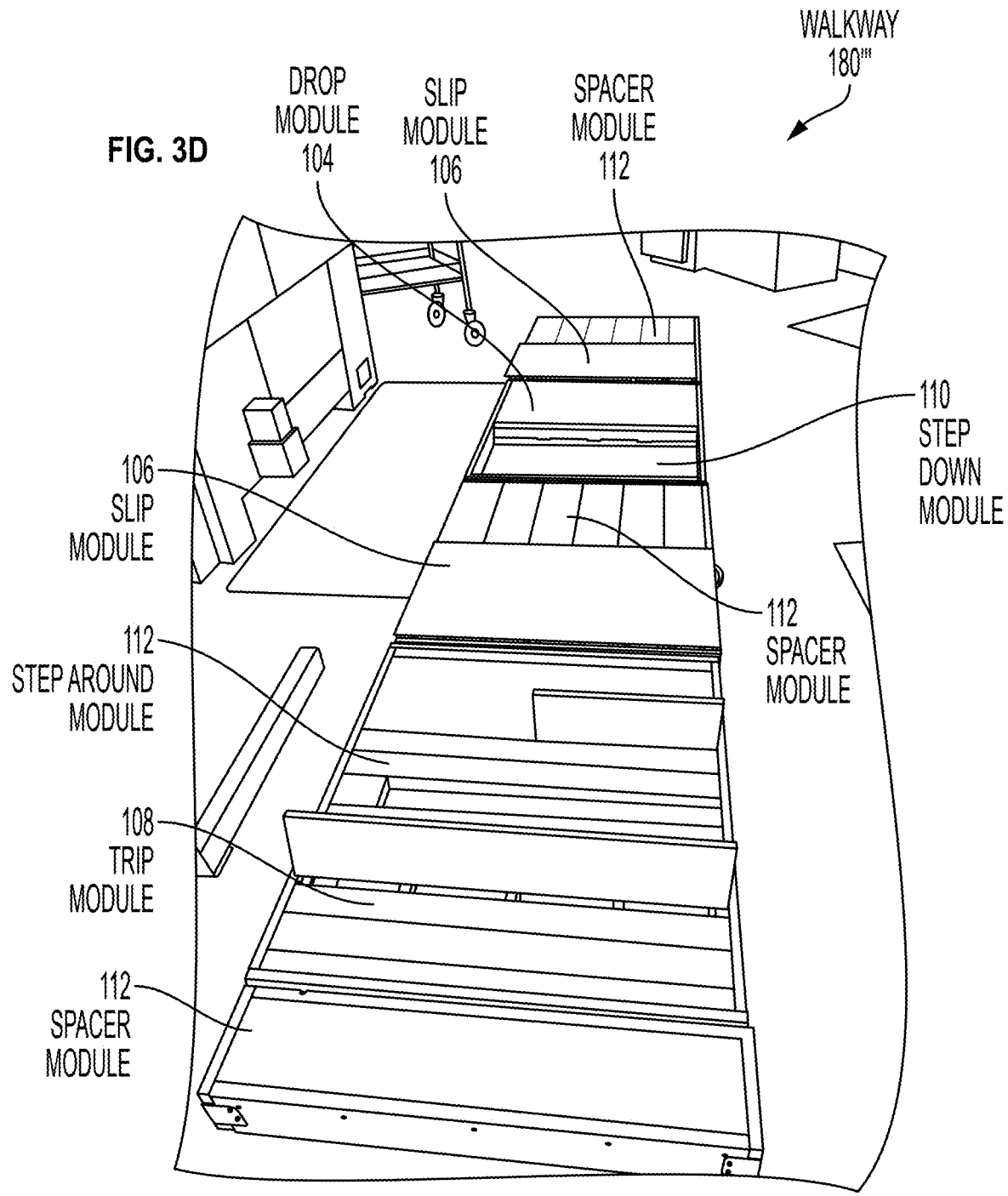

MODULAR SYSTEM AND METHOD FOR TESTING BALANCE

CROSS-REFERENCE TO RELATED APPLICATIONS

This application claims benefit of Provisional Appln. 63/325,310, filed Mar. 30, 2022, the entire contents of which are hereby incorporated by reference as if fully set forth herein, under 35 U.S.C. § 119 (e).

BACKGROUND

Fear of falling (FoF) is a serious and very common concern in approximately 30% of people who have never fallen and 60% in those who have previously fallen, with 40% of these individuals having at least one future fall, irrespective of physiological fall risk.[1] Although this fear can be deemed rational, causing one to reduce attempts at legitimately risky activities, it is often maladaptive, irrational, or excessive, leading one to catastrophize future everyday tasks. Much research has been directed towards the cycle of secondary effects of FoF, stemming from reduced activity that links FoF to future falls.[2,3] However, the direct links between FoF and future falls has received far less attention.

SUMMARY

Conventional methods have been employed for investigation of a perceived fall threat[4-6] or first trial responses to unanticipated balance perturbations[7]. These conventional methods provide some insight, with evidence of increased muscular co-contraction and startle-like behavior, respectively. Moreover, the known effect of anxiety on attentional processes[8-10] is also a likely contributor to impaired balance control.[11] Nevertheless, there is a lack of empirical evidence in these conventional methods as to whether and how such factors affect recovery from imbalances during gait. These conventional methods lack ecological validity in that the perturbation type and location is known, even if the timing is unknown. Moreover, balance rehabilitation paradigms are focused on proactive mechanisms and do not address the cognitive underpinnings of FoF that involve reactive balance control.

To overcome these noted drawbacks of conventional methods, the inventor of the present invention recognized that until methods to assess and treat the relationship between emotional and sensorimotor fall risk factors are developed, the wholistic and long-term success of balance and fall interventions will fail to be achieved. Accordingly, the inventor of the present invention developed a modular balance (MOBAL) walkway that allows proactive and reactive balance perturbations in individuals with FoF. This unique system includes interchangeable single or combined balance challenges based on user needs and represents the first low cost, user-friendly, and portable device for assessment and progressive balance training across multiple environmental demands. Based on data gathered with this MOBAL walkway, the inventor aims to develop and test a model that links FoF and reactive balance function to advance interventions for the prevention of falls in the aging population.

In a first set of embodiments, an apparatus is provided that includes a plurality of modules detachably coupled together to form a walkway. Each module includes an obstacle. The obstacle of one of the modules is a movable obstacle configured to move from a first position to a second position. The obstacle of another of the modules is a fixed obstacle in a fixed position.

In a second set of embodiments, a system is provided that includes the apparatus of the first set of embodiments. The system also includes a sensor configured to measure a value of a parameter indicating a characteristic of motion of a subject over the walkway. The system also includes a processor and a memory including one or more sequences of instructions. The memory and the one or more sequences of instructions are configured to, with the processor, cause the system to receive the value of the parameter indicating the characteristic of motion of the subject based on navigation of each obstacle of each module along the walkway. The memory and the one or more sequences of instructions are further configured to, with the processor, cause the system to store the value of the parameter in the memory.

In a third set of embodiments, a method is provided for using the system of the second set of embodiments. The method includes detachably coupling a plurality of modules together to form a walkway, where each module comprises a fixed or movable obstacle. The method further includes walking over each module of the walkway. The method further includes measuring, with a sensor, a value of a parameter indicating a response of a subject performing the walking step based on navigation of each fixed or movable obstacle of each module along the walkway. The method further includes receiving, at a controller, the measured value of the parameter for each fixed or movable obstacle of each module. The method further includes storing, in a memory of the controller, the measured value of the parameter for each fixed or movable obstacle of each module.

Still other aspects, features, and advantages are readily apparent from the following detailed description, simply by illustrating a number of particular embodiments and implementations, including the best mode contemplated for carrying out the invention. Other embodiments are also capable of other and different features and advantages, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

Embodiments are illustrated by way of example, and not by way of limitation, in the figures of the accompanying drawings in which like reference numerals refer to similar elements and in which:

FIG. 2C is an image that illustrates an example of a trip module of the plurality of modules in the system of FIG. 1A, according to an embodiment;

FIGS. 3A through 3D are images that illustrate an example of end perspective views of various walkways used with the system of FIG. 1A, according to an embodiment;

DETAILED DESCRIPTION

Figure 1A:
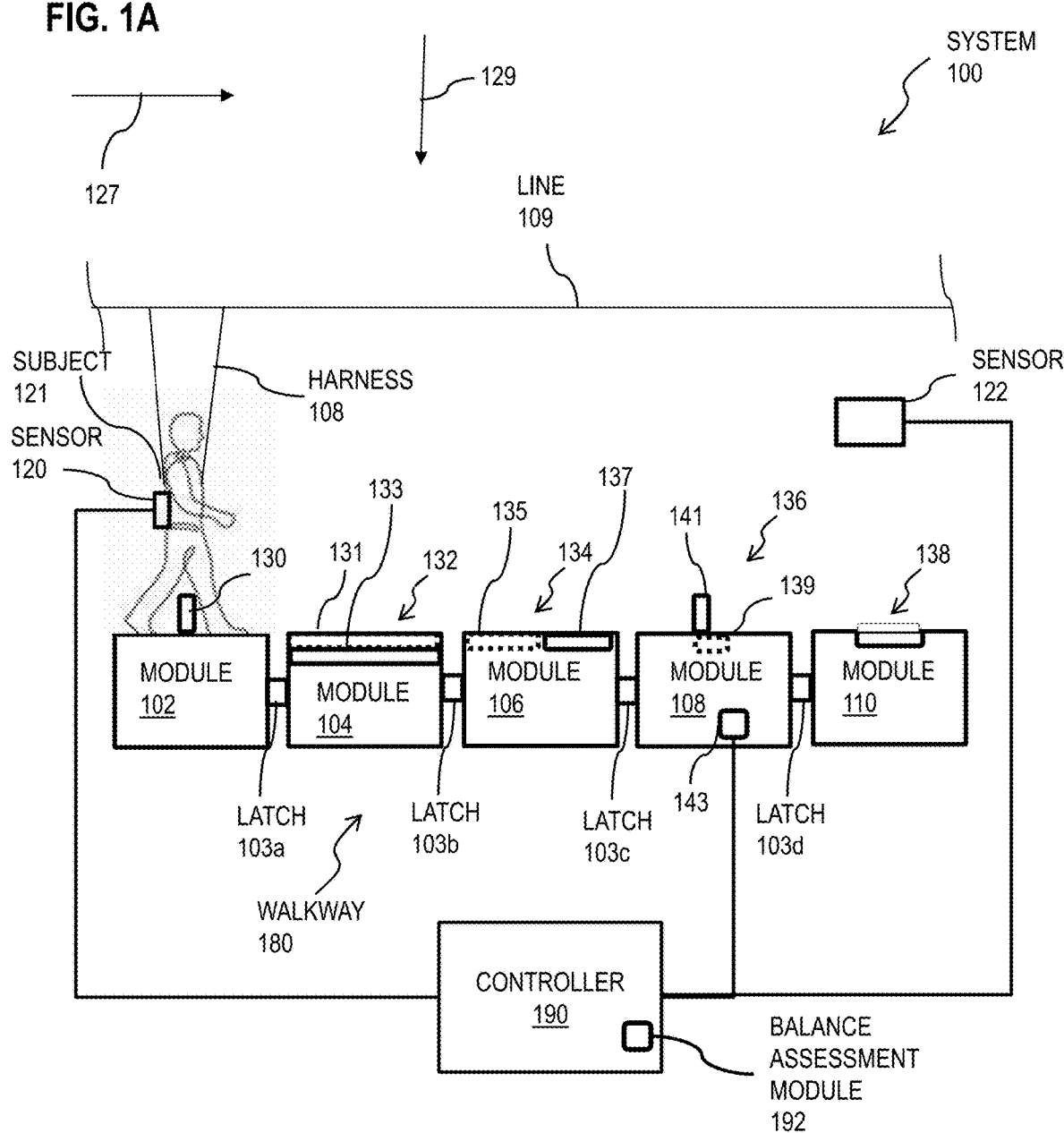
FIG. 1A is a block diagram that illustrates an example of a side view of a system for testing the balance of a subject, according to an embodiment.

A method and apparatus are described for testing and improving balance. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements at the time of this writing. Furthermore, unless otherwise clear from the context, a numerical value presented herein has an implied precision given by the least significant digit. Thus, a value 1.1 implies a value from 1.05 to 1.15. The term "about" is used to indicate a broader range centered on the given value, and unless otherwise clear from the context implies a broader range around the least significant digit, such as "about 1.1" implies a range from 1.0 to 1.2. If the least significant digit is unclear, then the term "about" implies a factor of two, e.g., "about X" implies a value in the range from 0.5X to 2X, for example, about 100 implies a value in a range from 50 to 200. Moreover, all ranges disclosed herein are to be understood to encompass any and all sub-ranges subsumed therein. For example, a range of "less than 10" for a positive only parameter can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

Some embodiments of the invention are described below in the context of testing and improving balance of a subject. However, the invention is not limited to this context. In other embodiments the invention is described in the context of assessing a balance of a subject with a fear of falling (FoF). In still other embodiments, the invention is described in the context of determining the extent to which FoF affects the balance of the subject. In still other embodiments, the invention is described in the context of assessing a balance of a subject with FoF that arises from any condition, including but not limited to Parkinson's Syndrome, stroke, injury, neurodevelopmental disorder or neuro damage.

1. FEAR OF FALLING (FOF) AND BALANCE

Falls are the leading cause of fatal and non-fatal injuries and the leading cause traumatic brain injuries in older adults.[14] About two-thirds of community-dwelling fallers report persistent concerns about falling and a third of people who have never had a fall report the same concern,[15] suggesting that the FoF may be more common than falls themselves.[16] While this fear may appropriately reflect an individual's reduced balance capabilities, it can also be excessive and phobic in nature. Among older individuals, those with a FoF are twice as likely to have a future fall and demonstrate a 4-fold likelihood of being admitted to a long-term care facility compared to those without such fear. It has been shown that the secondary effects of FoF can lead to restriction of physical activity, reduced strength, deconditioning, and decreased mobility, consequently increasing one's fall risk and decreasing quality of life.[2,3,13] However, findings that reduced balance confidence is an independent predictor of future falls, even after controlling for cognitive and physical factors, underscores the fact that FoF should be considered a significant problem in its own right.

Evidence of the direct effects of FoF on balance control have been limited to level ground walking or static standing with platform tilt. The typical cautious gait pattern employed by those with fall related anxiety has been studied since it was first described in 1982.[17,18] This pattern includes increased muscular co-contraction with joint stiffening and altered spatiotemporal parameters, including reduced stride length, reduced speed, and increased double support time.[19] Each of these gait adaptations indicate a way by which a safer, more stable gait may be achieved.[19,20] However, the opposite effect has been observed in the efficiency of dynamic balance during gait,[20] and likely also affects the reactive conditions encountered during unexpected imbalances.

Exaggerated balance responses in individuals with FoF may be triggered by fall-related startling stimuli. The "classic startle", when triggered from relaxed standing or sitting, induces a fast, predominantly flexion response in many muscles throughout the body.[22] The pontomedullary neurons in which these reflexes appear to originate are not modality specific, meaning that the classic startle can be triggered by auditory, tactile, visual vestibular inputs. Thus, with the convergence of these stimuli during whole body imbalances, balance perturbations themselves can serve as startling stimuli.[23,24] Repeated exposure to the same stimuli typically leads to habituation with decreased amplitude of muscular responses. However, individuals with anxiety disorders, such as post-traumatic stress disorder or general anxiety disorder, demonstrate excessive startle reflexes with a relatively slow rate of habituation. Importantly, these exaggerated responses have not yet been explored in individuals with FoF. Gaining insight into ways by which exaggerated movements can influence reactive balance responses may provide essential evidence regarding the direct link between FoF and the risk of future falls.

Anxiety related to FoF interferes with gait and balance performance during secondary cognitive tasks. This interference effect results in reduced gait speed and prolonged anticipatory postural adjustments during gait initiation.[16,25] Since the automaticity of walking appears to be affected by fear, competition for cognitive resources by a secondary cognitive task results in pronounced effects on gait.[26] In contrast to the proactive task demands of walking, reactive balance responses to unexpected perturbations involve attention switching mechanisms, whereby an ongoing cognitive task is halted to attend to incoming sensory stimuli regarding the perturbation magnitude and direction.[27] Consequently, the well-known effect of fear and anxiety on attentional control, such as difficulty with attention switching and disengaging from perceived threatening stimuli,[10] reduction in working memory,[9] and reduced ability to ignore task irrelevant stimuli,[8] may each influence the efficiency by which a fast response to balance perturbations must be employed to effectively restore stability.

Despite the importance of protective reactions to balance perturbations and the direct relationship of FoF to fall risk, targeted interventions aimed at integrating these two factors to improve reactive balance control in older adults is lacking. An important consideration during protective balance movements in general, is the time-critical cortical integration of online sensory feedback reflecting the evolving state of instability of the body.[28] The challenge for older adults with FoF, however, is the identification of optimal balance recovery strategies in the presence of anxiety-related influences on both attention and sensory function as well as the tendency to proactively 'stiffen' the muscles in an attempt to stabilize.[29,30] Although abnormalities in gait during proactive tasks have been identified, the effect of these strategies on reactive balance mechanisms, when motor planning is not an option, have not been studied in individuals with FoF. Therefore, there is a significant gap in the understanding of ways by which therapeutic approaches can best be targeted in these individuals.

There is currently no low-cost, portable, commercially available balance assessment and training walkway to train both proactive and reactive balance control. While the ActiveStep® treadmill (www.simbex.com) allows balance perturbations using treadmill belt translations, the >$100K price tag is prohibitive for many clinic owners and it has only limited effectiveness in improving responses to slips during over ground gait.[32] In contrast, laboratory based reactive training and testing devices only offer a single type of perturbation such as a slip or trip during over ground gait, but the devices are not portable nor user-friendly for clinic use. Moreover, although the timing of these laboratory perturbations is unknown, the location and perturbation type is fixed, which essentially restricts the number of unexpected variables to one.

2. OVERVIEW

An apparatus will now be discussed that is used for testing and improving the balance of subjects. FIG. 1A is a block diagram that illustrates an example of a system 100 for testing the balance of a subject 121, according to an embodiment. The subject 121 is not part of the system 100. As shown in FIG. 1A, in an embodiment the system 100 includes an apparatus with a plurality of modules 102, 104, 106, 108, 110 detachably coupled together to form a walkway 180. Although five modules are depicted in FIG. 1A forming the walkway 180, in other embodiments less or more than five modules can be used to form the walkway 180. Each module 102, 104, 106, 108, 110 includes an obstacle. The obstacles of the modules 102, 104, 106, 108, 110 are configured to cause reactions by the subject 121 navigating the obstacles as the subject 121 walks along the walkway 180. In some embodiments, the system 100 includes only the walkway 180 and the modules and excludes the other components of the system discussed herein.

The coupling of the modules together to form the walkway 180 is now discussed. In an embodiment, as shown in FIG. 1A the modules of the walkway 180 are detachably coupled together. In one embodiment, the modules of the walkway 180 are detachably coupled together with respective latches 103a, 103b, 103c, 103d positioned between each adjacent pair of modules. These latches advantageously permit the order of the modules in the walkway 180 to be easily changed by simply detaching the latches, changing the order of the modules and then reattaching the latches after the modules are arranged in a preferred order. Alternatively, the latches advantageously permit one or more of the modules to be removed and replaced by new modules by simply detaching the latches of the module to be removed, replacing these modules with new modules and attaching the latches of the new modules with the latches of the other modules. Alternatively, the latches advantageously permit the orientation of one or more modules to be changed (e.g., reversed in orientation so that a movable obstacle becomes a fixed obstacle, as further discussed herein). In an example embodiment, the respective latches include but are not limited to bolt latches, spring latches, toggle latches, or hook and eye latches.

Those modules with movable obstacles will now be discussed. In an embodiment, some of the modules 104, 106, 108 has a movable obstacle that is configured to move from a first position to a second position. In one embodiment, these movable obstacles can be activated to move from the first position to the second position to increase the likelihood of causing a rection by the subject 121 navigating the movable obstacle. For some of these modules 104, 106, the movable obstacle is configured to move from the first position to the second position based on a force imparted (e.g. by the subject) on the module 104, 106.

Figure 1B:
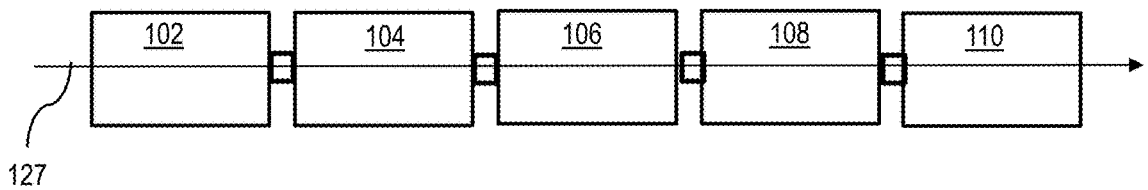
FIG. 1B is a block diagram that illustrates an example of a top view of the walkway of the system of FIG. 1A, according to an embodiment.

In an embodiment, one of the modules with a movable obstacle is a slip module 106. This slip module 106 has a surface that is configured to slide when stepped on by the subject 121. In this embodiment, the movable obstacle 134 is a surface of the slip module 106 that is configured to move from the first position 135 to the second position 137 in a first direction 127 along the walkway 180 based on the force imparted on the slip module 106 in the first direction 127. As shown in the top view of the walkway 180 in FIG. 1B, for purposes of this description, "first direction 127" means a direction defined by the walkway 180 (e.g. a direction along an axis that intersects each module along the walkway 180). In an example embodiment, the force imparted on the slip module 106 in the first direction 127 is an anteriorly directed (e.g. along the direction 127) force applied to the slip module 106 by the subject 121 when walking along the walkway 180 in the first direction 127.

In an embodiment, another one of the modules with a movable obstacle is a drop module 104. This drop module 104 has a surface that is configured to drop when stepped on by the subject 121. In this embodiment, the movable obstacle 133 is a surface of the drop module 104 that is configured to move from the first position 131 to the second position 133 in a second direction 129 that is orthogonal to the first direction 127 based on a force imparted on the drop module 104 in the second direction 129. In an example embodiment, the force imparted on the drop module 104 in the second direction 129 is a weight of the subject 121 applied to the drop module 104 when walking along the walkway 180 in the first direction 127.

In an embodiment, another one of the modules with a movable obstacle is a trip module 108. This trip module 108 causes a step to activate when the subject 121 is in close proximity to the module. Unlike the slip module 106 and drop module 104, whose movable obstacles are activated by a force imparted by the subject 121, the movable obstacle 136 of the trip module 108 is remotely activated (e.g. by an operator, a motor activated by a sensor, etc.). In this embodiment, the movable obstacle 136 is a step that is configured to move from a first position 139 (where the step does not obstruct the walkway 180) to a second position 141 (where the step does obstruct the walkway 180). In this embodiment, in the first position 139 the step is aligned with the first direction 127 and in the second position 141 the step is oriented at an angle (e.g. orthogonal angle) relative to the first direction 127. In an example embodiment, in the first position 139 the step is positioned within a cavity defined by the trip module 108 and when activated the step rotates from the first position 139 to the second position 141. As shown in FIG. 1A, when the step is positioned within the cavity in the first position 139 the step is coplanar with the rest of the trip module 108 surface and the surface of adjacent modules.

As shown in FIG. 1A, in an embodiment the system 100 includes a motor 143 that is communicatively coupled with a controller 190. In this embodiment, upon the subject 121 coming into close proximity of the trip module 108 (e.g. as determined by a sensor, human operator, etc.), the controller 190 transmits a signal to the motor 143 which causes the step of the trip module 108 to move from the first position 139 to the second position 141. In an example embodiment, the controller 190 is a remote control operated by a human operator and the human operator causes the controller 190 to transmit the signal to the motor 143 with a user input device (e.g. keypad) on the remote control. In other embodiments, a motion sensor is provided that detects the presence of the subject in proximity to the module 108 and sends a signal to the controller 190, which in turn transmits a signal to the motor 143 to move the step to the second position 141.

Some of the modules have fixed obstacles that remain in a fixed position and thus are less difficult to navigate than the modules having movable obstacles. These modules with fixed obstacles will now be discussed. In an embodiment, as shown in FIG. 1A, one of the modules with a fixed obstacle is a step over module 102 and the fixed obstacle 130 is a step. To navigate the fixed obstacle 130, the subject 121 steps over the step and onto the next module. Unlike the trip module 108 where the step moves into position when the subject 121 comes into close proximity of the trip module 108, the step of the step over module 102 is fixed. As further shown in FIG. 1A, another one of the modules with a fixed obstacle is a step down module 110 and the fixed obstacle 138 is a cavity defined by the step down module 110. To navigate the fixed obstacle 138, the subject 121 steps down into the cavity and then up out of the cavity to the next module. In both modules 102, 110 with the fixed obstacles 130, 138, the fixed obstacle involves an elevation change in the surface of the walkway 180, thus causing the subject 121 to step up or down so to navigate this elevation change.

In some embodiments, movement of the subject while navigating the module obstacles is monitored. In an embodiment, as the subject 121 navigates the modules of the walkway 180, in some embodiments the system 100 provides one or more sensors to monitor the movement of the subject 121 as they navigate the module obstacles. In an embodiment, as shown in FIG. 1A, the system 100 includes a sensor 122 (e.g. video camera) that is configured to capture image data of the subject 121 navigating the walkway 180.

Figure 6:
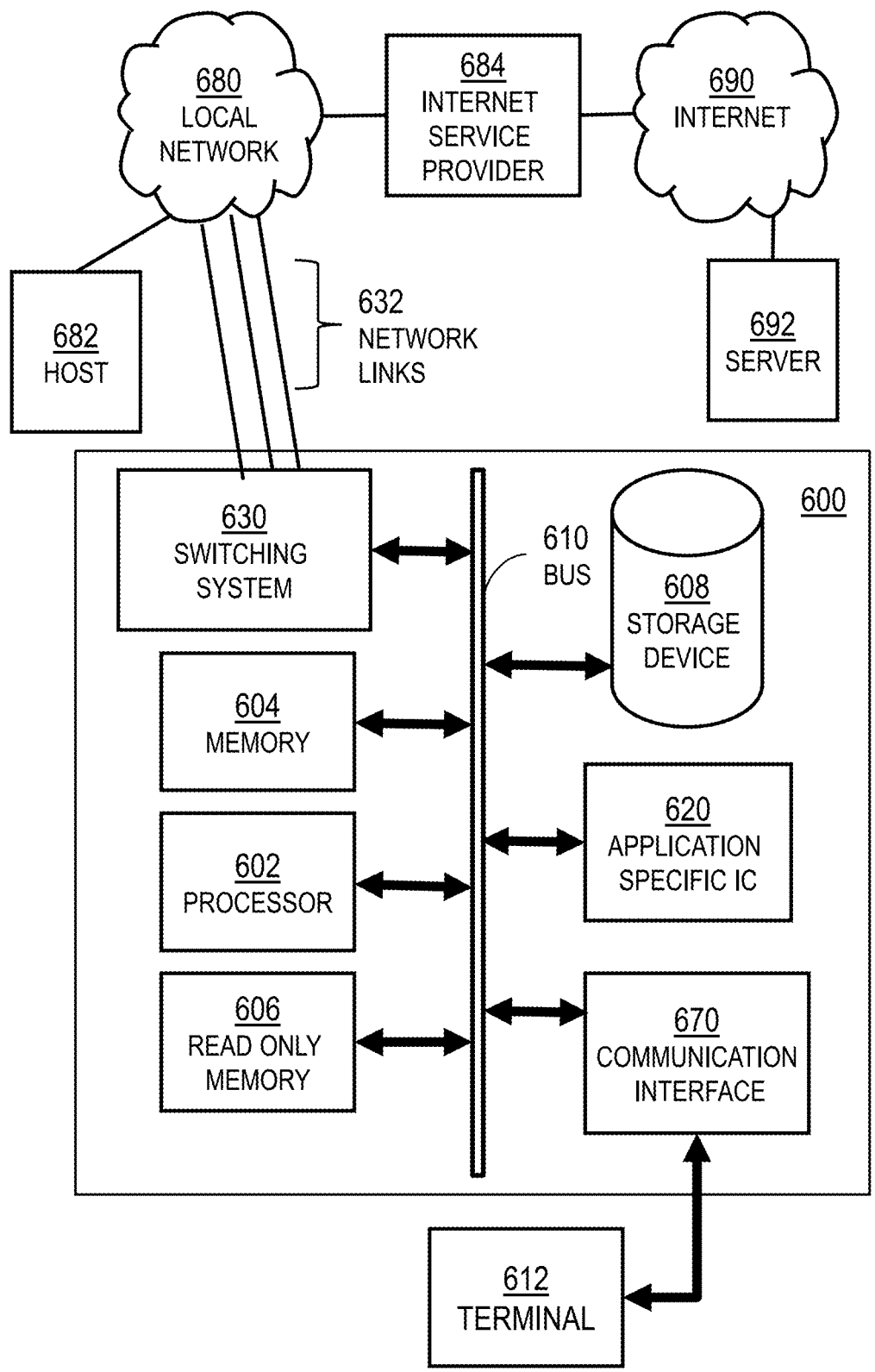
FIG. 6 is a block diagram that illustrates a computer system upon which an embodiment of the invention may be implemented.
Figure 7:
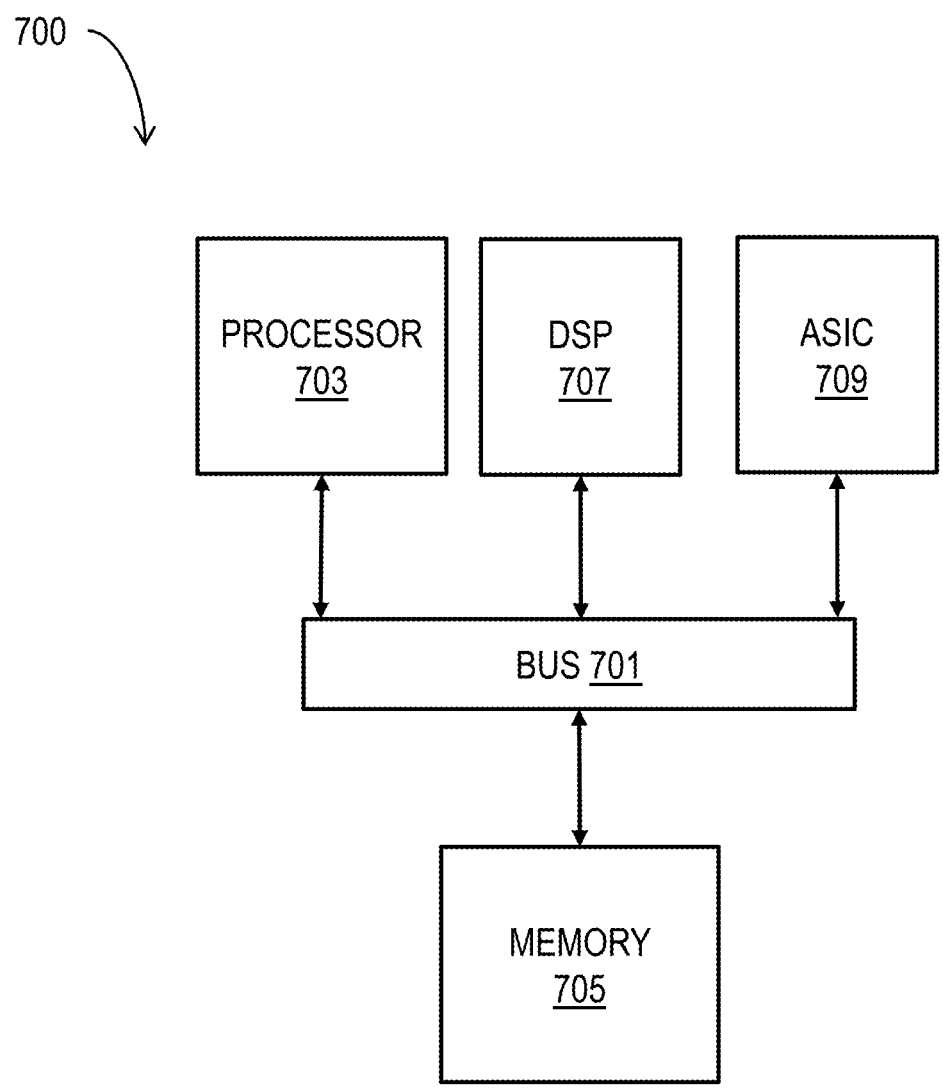
FIG. 7 illustrates a chip set upon which an embodiment of the invention may be implemented.

In some embodiments, the sensor 122 is an inertial motion capture unit configured to measure kinematics of one or more limbs of the subject 121 during navigation of each obstacle of each module. In this embodiment, the sensor 122 is communicatively coupled with the controller 190 and sensor data from the sensor 122 is transmitted to the controller 190. In some embodiments, the controller 190 uses the sensor data to determine a value of a parameter indicating a characteristic of motion of the subject 121 over the walkway 180. The controller 190 can also store these parameter values in a memory of the controller 190. In various embodiments, the controller 190 includes a balance assessment module 192 that includes instructions to cause the controller 190 to perform one or more steps of the method 400 of FIG. 4. In still other embodiments, the controller 190 is a general purpose computer system, as depicted in FIG. 6 or one or more chip sets as depicted in FIG. 7.

In some embodiments, the system monitors whether or not the subject falls while navigating the module obstacles. In an embodiment, the system 100 includes a safety harness 108 that is attached to the subject 121 and supported by a line 109 anchored at both ends of the walkway 180. As further shown in FIG. 1A, in some embodiments, a sensor 120 is operatively attached to the harness 108 and is configured to measure a force imparted on the harness 108 by the subject 121. In an example embodiment, the sensor 120 is communicatively coupled with the controller 190 and transmits data indicating a force imparted on the sensor 120 by the subject 121. The data from the sensor 120 can be used by the controller 190 to determine whether a fall occurred as the subject 121 navigated the obstacles of the modules on the walkway 180. In an example embodiment, the sensor 120 is a load cell.

Figure 2A:
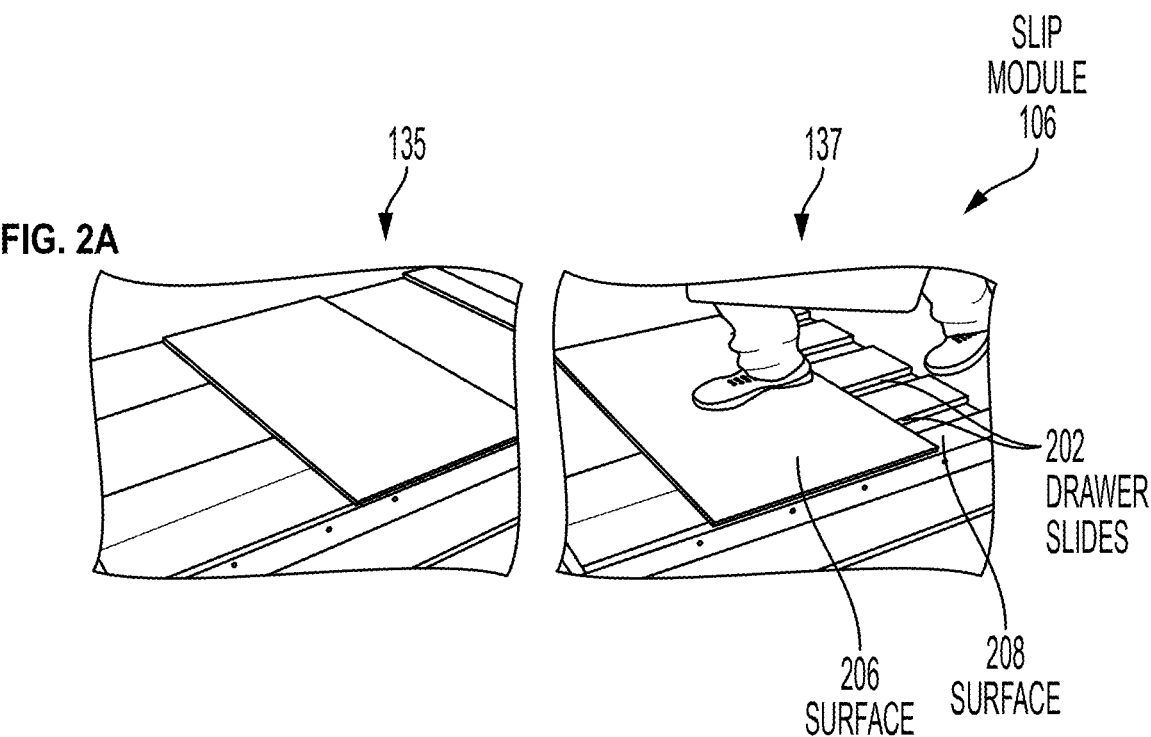
FIG. 2A is an image that illustrates an example of a slip module of the plurality of modules in the system of FIG. 1A, according to an embodiment.

The slip module 106 will now be discussed in more detail. FIG. 2A is an image that illustrates an example of the slip module 106 of the plurality of modules in the system 100 of FIG. 1A, according to an embodiment. As shown in FIG. 2A, the movable obstacle 134 of the slip module 106 is a first surface 206 of the slip module 106 that is configured to move relative to a second surface 208 of the slip module 106. In an example embodiment, the slip module 106 is configured to allow a slip of about 45 centimeters (cm) or in a range from about 30 cm to about 60 cm, between the first and second positions 135, 137. As shown in FIG. 2A, in one example embodiment, the slip module 106 is configured such that the first surface 206 is slidably coupled to the second surface 208. In one example embodiment, a plurality of drawer slides 202 (e.g. four) are mounted to the second surface 208 and slidably receive the first surface 206. However, although FIG. 2A depicts drawer slides 202 being used to slidably receive the first surface 206 to the second surface 208, in other embodiments ball bearings within a linear shaft or a glycerin undersurface may be used. In an example embodiment, the use of drawer slides 202 involves a weight restriction (e.g. about 175 pounds) of a subject 121.

As shown in FIG. 1A, the first surface 206 of the slip module 106 is configured to move from the first position 135 to the second position 137 when the slip module 106 is oriented in the walkway 180 as shown in FIG. 1A. However, if the slip module 106 of FIG. 1A is reversed in orientation within the walkway 180, the first surface 206 of the slip module 106 will remain in the first position 135 even when force is imparted on the slip module 106 in the first direction 127. Thus, the inventor of the present invention recognized that the slip module 106 advantageously provides more flexibility in the modularity of the walkway 180, by serving as either a movable obstacle or fixed obstacle, depending on its orientation in the walkway 180. This feature is further enhanced by the use of the latches 103, which permit the slip module 106 to be easily detached and reattached in a reverse orientation.

Figure 2B:
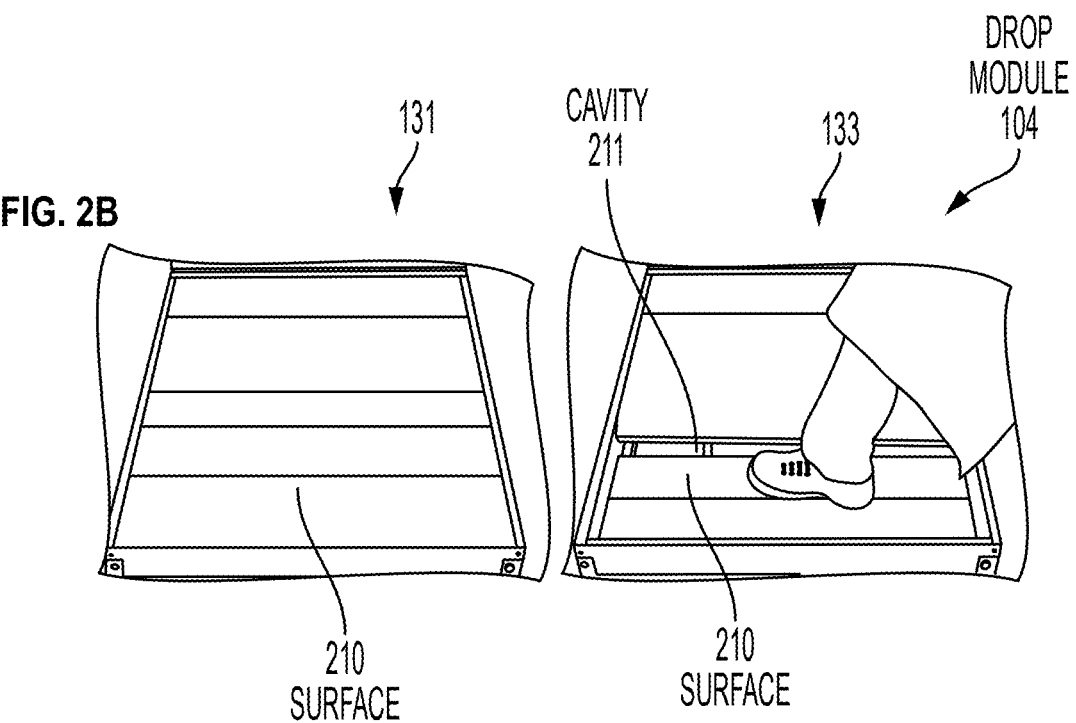
FIG. 2B is an image that illustrates an example of a drop module of the plurality of modules in the system of FIG. 1A, according to an embodiment.

The drop module 104 will now be discussed in more detail. FIG. 2B is an image that illustrates an example of the drop module 104 of the plurality of modules in the system 100 of FIG. 1A, according to an embodiment. As shown in FIG. 2B, the movable obstacle 132 of the drop module 104 is a surface 210 of the drop module 104 configured to move from the first position 131 to the second position 133 in the second direction 129 orthogonal to the first direction 127 along the walkway 180. In one embodiment, the surface 210 is configured to move from the first position 131 to the second position 133 based on a force (e.g. weight of the subject 121 standing on the surface 210) imparted on the surface 210 in the second direction 129. In one example embodiment, the drop module 104 includes one or more springs (not shown) positioned between surface 210 of the drop module 104 and a cavity 211 defined by the drop module 104. In this example embodiment, the one or more springs (e.g. spring loaded door hinges) impart a force on the surface 210 in an opposite direction of the second direction 129, to maintain the surface 210 in the first position 131 in the absence of the force imparted on the drop module 104 in the second direction 129. In an example embodiment, the drop module 104 is configured such that the surface 210 drops by a vertical distance (e.g. about 8 cm or in a range from about 4 cm to about 12 cm) from the first position 131 to the second position 133. In an example embodiment, the drop module 104 is made from light weight material, such as aluminum or plastic.

The trip module 108 will now be discussed in more detail. FIG. 2C is an image that illustrates an example of the trip module 108 of the plurality of modules in the system 100 of FIG. 1A, according to an embodiment. In an embodiment, the movable obstacle 136 of the trip module 108 is a step 212 that is moved from the first position 139 (e.g. where the step 212 does not form an obstacle along the walkway 180) to the second position 141 (e.g. where the step 212 does form an obstacle along the walkway 180). In one embodiment, in the first position 139 the step 212 is positioned within a cavity and is coplanar with the other portion of the trip module 108 and/or with the surface of adjacent modules. In an example embodiment, the step 212 has a height of about 15 cm or in a range from about 10 cm to about 20 cm. In an example embodiment, the trip module 108 is made from light weight material, such as aluminum or plastic.

The motor that is used to activate the trip module is now discussed in more detail. In an embodiment, the motor 143 (FIG. 1A) that is communicatively coupled to the controller 190 and is configured to cause the step 212 to move from the first position 139 to the second position 141 is a solenoid 204. In this example embodiment, the solenoid 204 is configured to hold the step 212 in the first position 139 and upon receiving the signal from the controller 190 the solenoid 204 is configured to release to step 212 so that the step 212 moves to the second position 141 (e.g. manual release). As shown in FIG. 2C, in one embodiment in the second position 141 the step 212 is oriented at an angle (e.g. orthogonal angle) relative to the other surface of the trip module 108 and/or the adjacent modules along the walkway 180. After the subject 121 navigates the step 212 and moves past the trip module 108 the controller 190 is configured to transmit a signal to the sensor 143 (e.g. solenoid 204) to move the step 212 back from the second position 141 to the first position 139. As previously discussed, the controller 190 transmits the signal to the sensor 143 based on one of a manual input from a human operator or an input from a sensor indicating that the subject 121 has moved past the trip module 108.

Figure 3A:
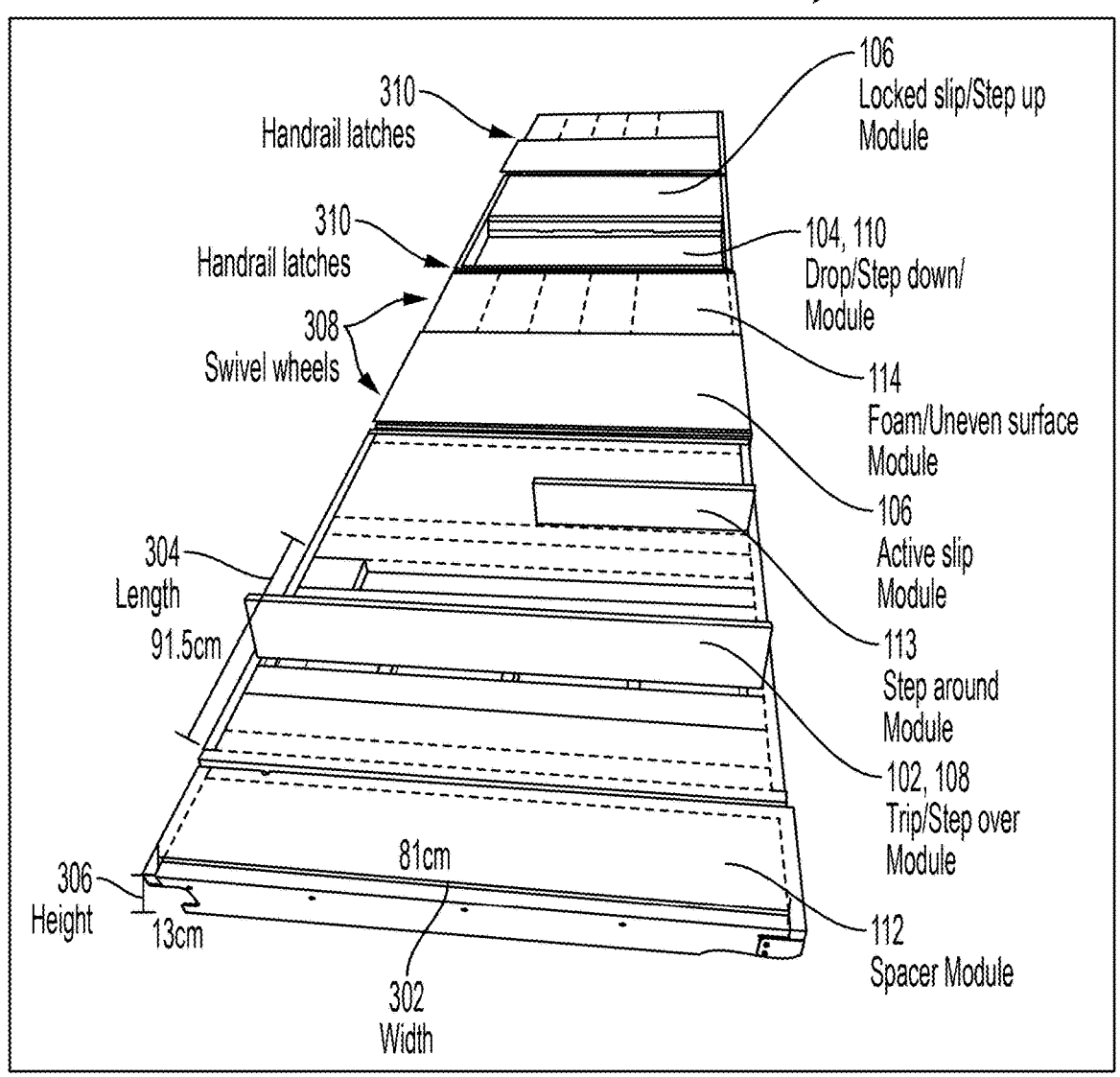

Various additional modules will now be discussed that can be used to form the walkway 180. FIG. 3A is an image that illustrates an example a walkway 180 that includes these additional modules. As shown in FIG. 3A, in some embodiments each module has certain dimensions including a width 302, a length 304 and a height 306. In an example embodiment, the width 302 is about 81 cm or in a range from about 70 cm to about 90 cm; the length 304 is about 91 cm or in a range from about 80 cm to about 100 cm; and the height 306 is about 13 cm or in a range from about 8 cm to about 20 cm. However, in some embodiments the modules have dimensions that are outside this range and/or the modules can have different dimensions.

As shown in FIG. 3A, in some embodiments a spacer module 112 is provided that does not feature a movable or fixed obstacle. In an embodiment, the spacer module 112 is used as a first or last module along the walkway 180. Alternatively, in other embodiments, the spacer module 112 can be used as an intermediate module along the walkway 180, since not every module need feature an obstacle. This advantageously enhances the unpredictability of the obstacles of the modules along the walkway 180, from the standpoint of the subject 121. In an example embodiment, the spacer module 112 is optional and can account for differences in step lengths when using modules with different fixed obstacles.

As shown in FIG. 3A, in some embodiments the step over module 102 is provided that was also shown in FIG. 1A. In one embodiment, the fixed obstacle 130 of the step over module 102 is a step that extends across the step over module 102. In an example embodiment, the step extends across the entire width 302 of the step over module 102. As shown in FIG. 3A, the step extends above a surface of adjacent modules 112, 113 along the walkway 180. In an example embodiment, the step has a height of about 15 cm or in a range from about 10 cm to about 20 cm.

As shown in FIG. 3A, in some embodiments a step around module 113 is provided. As with the step over module 102, with the step around module 113 the fixed obstacle is a step. Unlike the step over module 102, the step around module 113 includes a step that only extends over a portion of the width 302 of the step around module 113. In an example embodiment, the step of the step around module 113 extends over about 50% or in a range from about 30% to about 70% of the width 302 of the step around module 113. In an example embodiment, the height of the step in the step around module 113 is greater than the height of the step in the step over module 102, since the step around module 113 is designed to cause the subject 121 to walk around the step rather than over the step, as in the step over module 102. In an example embodiment, the step has a height of about 30 cm or in a range from about 20 cm to about 40 cm.

As shown in FIG. 3A, in some embodiments an uneven surface module 114 is provided. In this embodiment, the fixed obstacle of the uneven surface module 114 is an uneven surface (e.g. foam material).

As shown in FIG. 3A, in some embodiments a step down module 110 is provided. In one embodiment, the fixed obstacle 138 of the step down module 110 is a cavity defined by the step down module 110 that extends below a surface of adjacent modules along the walkway 180. In an example embodiment, the cavity of the step down module 110 has dimensions of a width of about 3 feet or in a range from about 2 feet to about 4 feet; a length of about 2 feet or in a range from about 1 foot to about 3 feet and a height of about 9 inches or in a range from about 6 inches to about 15 inches.

As shown in FIG. 3A, in some embodiments handrail latches 310 are provided along the sides of one or more modules of the walkway 180. The handrail latches 310 are configured to be attached to a handrail (not shown) that extends along a side of one or more of the modules of the walkway 180. The inventor of the present invention recognized that the handrail latches 310 advantageously permit a handrail to be attached along the side of one or more of the modules to assist the subject 121 navigating the module obstacles along the walkway 180.

As shown in FIG. 3A, in some embodiments wheels 308 (e.g. swivel wheels) are provided along the sides of one or more modules of the walkway 180. The wheels 308 advantageously permit the walkway 180 to be movable along a floor surface. Additionally, the wheels 308 advantageously permit each module to be independently moveable along the floor surface, to facilitate moving, rearranging and/or reorienting one or more modules in the walkway 180. This enhances the modularity of the walkway 180 since it makes it easier to detach the modules, remove some modules from the walkway, move new modules into the walkway and/or rearrange the order or orientation of one or more modules in the walkway.

Figure 3C:
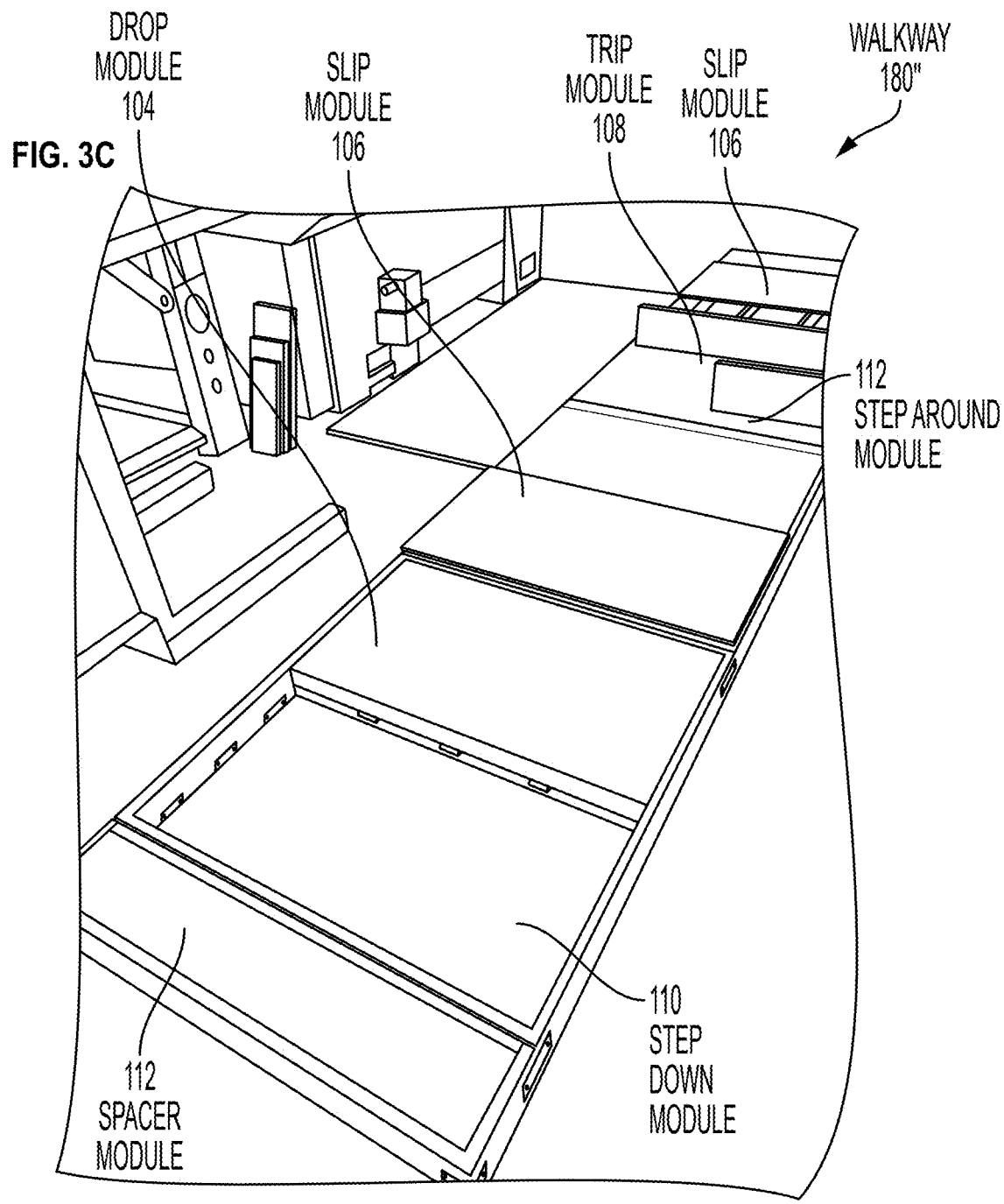

The particular order of the modules shown in the walkway 180 of FIG. 3A is just one example embodiment of how the modules of the walkway 180 can be selected and/or organized. FIGS. 3B through 3D show other embodiments where different modules are arrangement in a different order to provide different walkways 180', 180", 180'". In some embodiments, the selection of the modules, the arrangement of the modules and/or the orientation of the modules in the walkway is determined based on one or more factors. In one embodiment, the factor includes a characteristic of the subject 121 (e.g. age, medical condition, etc.). In some embodiments, a determination of which walkway modules to use will be made based on the tolerance of the subject. In one example embodiment, a subject with excessive fear may initially tolerate predictable and visible obstacles (e.g., modules with fixed obstacles, such as the step over module, step around module or foam module). In this example embodiment, as balance confidence improves, modules with unpredictable challenges (e.g., modules with movable obstacles, such as the slip module, trip module, drop module) may be inserted into the walkway.

Although FIGS. 3A through 3D show example embodiments of a plurality of modules arranged into different walkways 180, 180', 180", 180'", the embodiments of the present invention are not limited to these particular modular arrangement when forming the walkway. In some embodiments, the walkway is formed with any two or more modules. In another embodiment, the walkway is formed with at least one module having a movable obstacle and at least one module having a fixed obstacle.

In some embodiments, the walkway proposed herein incorporates a plurality (e.g. ten) real-world balance challenges that will be adjustable in level and configurations to meet individual subject needs. In one embodiment, the walkway includes three modules where each module has an movable obstacles (e.g. slip module, trip module, drop module). In another embodiment, the walkway includes six modules where each module has a fixed obstacle with varying degrees of visual contrast available (e.g., step down module, step over module, uneven surface module, step around module and step over module and uneven surface module). In yet another embodiment, the walkway includes a handrail (not shown) that is attached to the handrail latches 310 and can be placed on the side of any module.

Figure 4:
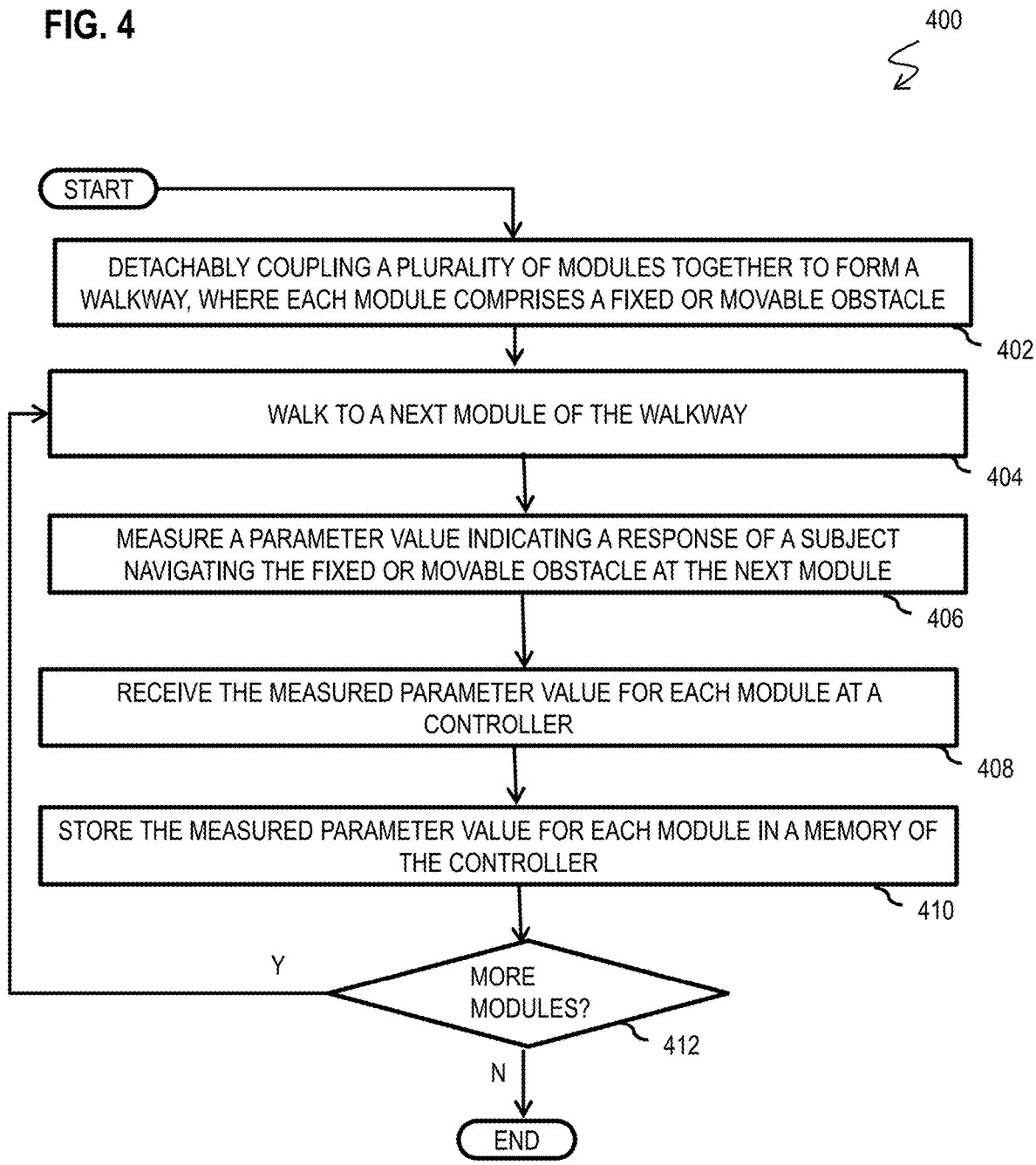
FIG. 4 is a flow diagram that illustrates an example method for using the system of FIG. 1A to test the balance of a subject, according to an embodiment.

A method of using the system 100 of FIG. 1A to assess the balance of one or more subjects navigating the module obstacles of the walkway will now be discussed. FIG. 4 is a flow diagram that illustrates an example method 400 for using the system 100 of FIG. 1A to test the balance of a subject, according to an embodiment. Although steps are depicted in FIG. 4 as integral steps in a particular order for purposes of illustration, in other embodiments, one or more steps, or portions thereof, are performed in a different order, or overlapping in time, in series or in parallel, or are omitted, or one or more additional steps are added, or the method is changed in some combination of ways.

In step 402, two or more modules are detachably coupled together to form a walkway. In step 402, two or more modules are selected from among the plurality of modules based on one or more factors (e.g. characteristic of the subject, such as age, medical condition, etc.). In step 402 the two or more selected modules are then arranged in a particular order based on one or more factors (e.g. characteristic of the subject). In step 402 the two or more selected modules arranged in the particular order are then detachably coupled together using the latches 103. As stated above, in some embodiments in step 402 the selection and order of modules will depend on the tolerance of the subject. In an example embodiment, a more fearful subject will first be exposed to modules with predicable challenges (e.g. modules with fixed obstacles). As the fear of falling decreases, unpredictable modules (e.g. modules with movable obstacles) can be selected with the order of presentation switched to maintain unpredictability.

In step 404, the subject 121 walks to a next module (e.g. first module) of the walkway 180 and navigates the obstacle (fixed or movable) of that module. In step 406, the sensors 120, 122 are used to measure a parameter value indicating a response of the subject while navigating the module obstacle. In one example embodiment, the sensor 120 measures a parameter value indicating whether the subject fell during the obstacle navigation. In another example embodiment, the sensor 122 measures a parameter value indicating motion of one or more portions or limbs of the subject during each obstacle navigation.

In step 406, the controller 190 receives data from the sensors 120, 122 which indicate the measured parameter value in step 404 for the current module. In step 408, the measured parameter value is stored in a memory of the controller 190 for the current module.

In step 412, a determination is made whether additional modules of the walkway 180 remain. Step 412 is a determination made by the subject 121 as they navigate the walkway 180. If the determination in step 412 is yes, then steps 404 through 410 are repeated for the next module. If the determination in step 412 is no, then the method 400 ends.

3. EXAMPLE EMBODIMENTS

3.1 System

In an example embodiment, the modules of the walkway are formed using any manufacturing method known to one of ordinary skill in the art. In an example embodiment embodiments, the modules of the walkway are designed and built using the 80/20 T-slot® aluminum building system (80/20® Inc.).

Although some embodiments of the modules involve a single obstacle for each module, in other embodiments a module can include multiple obstacles. In one embodiment, the module is dual function such that the module features two obstacles (e.g. fixed obstacle, movable obstacle, two fixed obstacles or two movable obstacles). In an example embodiment, the walkway 180 features a plurality (e.g. two or three) dual function modules where each module features the movable obstacle 134 of the slip module 106 and the fixed obstacle 130 of the step up module 102 or the fixed obstacle 138 of the step down module 110.

In an example embodiment, the slip module 106 features door glides with panels (e.g., using the 80/20 T-slot® aluminum building system from 80/20®, Inc) which have a certain thickness (e.g., about 60.75 cm thick). In another example embodiment, multiple slip modules 106 are used in the walkway 180 where some of the slip modules 106 are activated (e.g. arranged in an orientation such that they move from the first to the second position 135, 137 when the subject 121 steps on the module) while other slip modules 106 are deactivated (e.g. arranged in a reverse orientation such that they are locked in the first position 135 when the subject 121 steps on the module). The inventor of the present invention recognized that this will minimize anticipation of the subject 121 to the movable obstacle 134 of the slip modules 106.

In an example embodiment, when the slip module 106 is positioned in the walkway 180 and in the orientation such that it is locked in the first position 135, a step up or step down obstacle (e.g. step having a height of about 7.5 cm or in a range from about 5 cm to about 10 cm) can be positioned on the slip module 106.

In an example embodiment, a module can be provided with three horizontally arranged obstacles (e.g. surface 210 of the drop module 104, foam or uneven surface of the module 114 and the fixed obstacle 130, 136 of the step up or step down modules 102, 110). In this example embodiment, spring hinges are positioned to hold the drop surface 210 in place until activated by the subject 121 stepping on the drop surface 210. In this example embodiment, the fixed obstacle 130, 136 of the step up or step down module 102, 110 is adjustable in height and is positioned beneath the drop surface 210 to either reduce the drop height or lock it in place.

In an example embodiment, the drop surface 210 of the drop module 104 can be swapped out for foam (e.g. 8 cm foam) or an uneven hard surface cut to size. In another example embodiment, the drop surface 210 of the drop module 104 can be swapped out to allow for the fixed obstacle 130, 136 of the step up or step down modules 102, 110.

In an example embodiment, the harness 108 of the system 100 is a mobile safety harness system. In one embodiment, where the horizontal line 109 is anchored at both ends of the walkway 108, a rip-stich, shock absorbing, retractable lanyard, or deceleration device is provided to link the anchorage line 109 to the harness 108. In another example embodiment, the harness 108 is provided on wheels that can be moved with the user.

In an example embodiment, the sensor 120 is a load cell in the safety harness 108 that can be used to detect the presence of falls or the number/accuracy/timing of recovery steps. Additionally, reach-grasp responses following perturbations can be determined using the sensor 122 data with video analysis software, such as Kinovia® (www.kinovia.org). In other embodiments, an inertial motion capture unit (e.g., XSens MVN Analyze®, www.xsens.com) may record limb/trunk kinematics during obstacle negotiations.

In an example embodiment, the embodiments of the present invention develop a modular, user-friendly, low cost, and safe balance testing and training walkway. In one example embodiment, the system 100 can be used as the basis for a design that integrates multipurpose balance modules, a harness system, and reliable and clinically feasible assessment outcomes in individuals with FoF. In some embodiments, the configuration of the modules will be evaluated using principals of cognitive-exposure therapy, progressing from a single, anticipated obstacle to a series of anticipated plus unanticipated triggered obstacles with and without cognitive tasks.

3.2 Method

When assessing balance control, it is important to consider the interaction between the task of walking and the environmental challenges to be negotiated, whether through proactive obstacle avoidance, reactive responses to an unexpected trip, or in some cases meeting a combination of proactive and reactive task demands (e.g. preparing to step over an obstacle, when faced with an unexpected slip). Without direct exposure to these fearful situations, cautious behavior will continue to be reinforced and can lead to reductions in balance confidence as we have shown.[21]

The inventor of the present invention recognized that there is a significant gap in the understanding of ways by which therapeutic approaches can best be targeted in individuals with FoF. The method disclosed herein is designed to address this gap by developing the MOBAL walkway for use in both research and clinical settings to better assess and treat balance strategies.

Successful completion of the research discussed herein will lead to the development of a safe, user-friendly, low-cost, and effective walkway, along with the preliminary knowledge needed to support clinical evaluations of FoF and associated deficits that underlie impaired protective responses to imbalances. To date, no unifying theoretical framework has emerged to understand the underlying FoF mechanisms contributing to protective actions in response to a fall. Hence, the contribution of the method disclosed herein is to develop a device that will enable identification of the influence of FoF under varied balance task demands.

The embodiments of the method disclosed herein involve the development of the first modular balance walkway, with options for multiple configurations to individualize assessment and treatment of both proactive and reactive mechanisms of balance control.

A central hypothesis of the method disclosed herein is that the influence of FoF on fall risk is mediated by effects on both sensorimotor and attentional processes required for reactive balance recovery. In an example embodiment, the walkway disclosed herein can be used to assess these factors and address them with customized training. Preliminary findings support this hypothesis in that balance perturbations in individuals with reduced balance confidence resulted in movement time delays and decreased grasping accuracy. Cognitive testing and functional magnetic resonance imaging during surrogate tasks also revealed attention deficits and reduced connectivity in the attention shifting brain network in those with reduced balance confidence. Moreover, prior research supports the misdirected targets of FoF in fall prevention clinical trials, demonstrating a lack of change or even increase in FoF outcomes.[12,13]

Accordingly, some example embodiments of the method disclosed herein pursue certain specific aims (SA). One such SA is to validate clinical efficacy of the walkway disclosed herein. This validation is performed by assessing a) protective balance responses during unexpected perturbations in older adults with FoF compared to young adults and b) overall acceptance. In an example embodiment, 5 older adults with FoF (Falls Efficacy Scale-International, FES-I, score>23) were compared to 5 young, healthy adults. It was hypothesized that an overall effectiveness would be reduced in protective limb responses (indicated by greater 'fall' incidence into the safety harness with >30% body weight) and increased frequency of limb collisions. It was also predicted that the underlying mechanisms leading to these impaired responses will include (a) exaggerated first trial responses of arm and trunk displacement, (b) reduced habituation of this exaggerated response over multiple trials, (c) interference in attentional resources during secondary cognitive task performance, and (d) inability to reverse a preplanned balance strategy when imbalance characteristics are not as anticipated. It was also anticipated that overall subjective acceptance of the walkway from all ten participants and five physical therapists using a study specific questionnaire on ecological validity, harness comfort, safety, ease of use, and weight.

Completion of this study, resulting in MOBAL walkway development and validation, supports the first steps towards commercialization of the walkway and the creation of a novel cognitive behavioral-reactive balance assessment and training program that can be implemented in physical therapy clinics across the country. Such a program is ultimately anticipated to reduce FoF, enhance balance, prevent falls, and improve quality of life in the millions of individuals currently living with fall-related anxiety.

In an example embodiment, this contribution is significant because (1) it will advance the understanding of how FoF influences balance recovery strategies to a fall, (2) it will provide an innovative device for assessment of balance strategies in those with FoF, and (3) it will provide the tools by which a psychologically based rehabilitation approach can later be developed and conducted in a safe manner, leading to enhanced protective responses to loss of balance. The success of this research has the potential to lead to both a reduction in both FoF itself as well as its negative physical consequences on balance control, thereby reducing fall risk and improving quality of life in the millions affected by this psychological burden.[31] Gaining a better understanding of the underlying mechanisms of FoF on reactive balance control will serve as the basis by which to develop future intervention studies that merge well established psychological concepts with progressive exposure to proactive and then reactive balance challenges both with and without cognitive tasks.

In another example embodiment, the proposed research seeks to gain unprecedented insight and mitigate deficits in reactive balance control contributing to fall risk through the following innovations. One of such innovations is a first characterization of the role of FoF on protective strategies to unexpected balance perturbations similar to a real-life falls, both with and without attention requirements and environmental constraints. Another of such innovations is the use of an interdisciplinary collaboration beyond more prevalent neuromechanical approaches to balance and falls research. Overall, the development of the MOBAL walkway and application of the method disclosed herein will elucidate direct contributions of FoF to balance and gait, moving beyond mere assessment of secondary deconditioning effects. It was also anticipated that the MOBAL walkway will have applications to other aging and clinical populations, such as those with peripheral neuropathy and stroke.

In one example embodiment, the method and system disclosed herein provides a comprehensive and individualized over ground balance testing and training system that can be implemented in any laboratory or clinical setting.

In some example embodiments of the disclosed herein, an overall hypothesis is tested that, in older adults with FoF compared to young healthy adults, protective balance strategies to perturbations induced along the MOBAL walkway will be less effective and lead to greater frequency of in-task "falls". Underlying mechanisms are probed by which these unsuccessful balance responses occur through MOBAL walkway conditions that vary the environmental and cognitive constraints. In one example embodiment, it is also anticipated that both participants and physical therapists will subjectively accept the MOBAL walkway based on a study-specific questionnaire.

Figure 5:
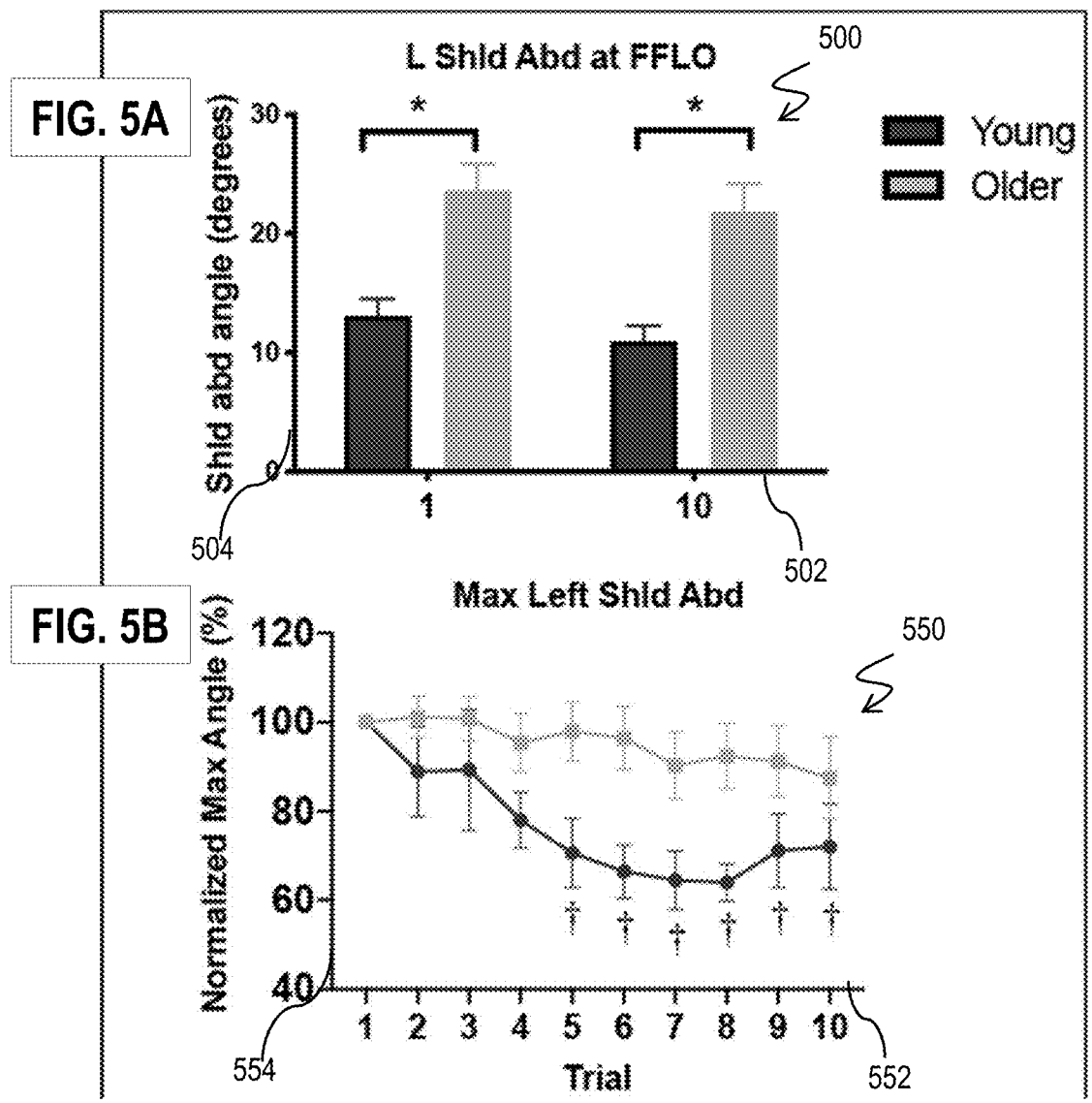
FIG. 5A is a histogram that illustrates an example of measured parameter values indicating a response of young and elderly subjects navigating the obstacles of the walkway in the system of FIG. 1A, according to an embodiment.
FIG. 5B is a graph that illustrates an example of normalized values of the measured parameter values in the histogram of FIG. 5A over a plurality of trials, according to an embodiment.

In an example embodiment of the method, balance of one or more subjects is perturbed in a controlled manner with the walkway and protective responses (based on sensor 122 data) of the subject are measured and quantified. The following preliminary data support the feasibility of this approach. In a study of 11 older and 11 young adults, arm responses of the subjects (e.g. based on sensor 122 data) were evaluated to rightward platform translations. Study complied during this study is depicted in FIGS. 5A and 5B. FIG. 5A is a histogram 500 that illustrates an example of measured parameter values indicating a response of young and elderly subjects navigating the obstacles of the walkway 180 in the system 100 of FIG. 1A, according to an embodiment. The horizontal axis 502 is the number of a trial of a subject walking on the walkway 180. The vertical axis 504 is an angular displacement of a shoulder joint (e.g. based on sensor 122 data) in units of degrees. FIG. 5B is a graph 550 that illustrates an example of normalized values of the measured parameter values in the histogram 500 of FIG. 5A over a plurality of trials, according to an embodiment. The horizontal axis 552 is the number of a trial (integer values) of a subject along the walkway 180. The vertical axis 554 is a normalized value of the value in the vertical axis 504 of the histogram 500 of FIG. 5A.

As shown in FIGS. 5A and 5B, in one example embodiment the older group (grey color bars in the histogram 500, grey curve in the graph 550) demonstrated greater angular displacement of the shoulder joint during balance recovery even prior to the first step, which did not habituate over 10 trials. In a prior study involving older fallers with FoF, reduced reach to grasp accuracy was reported[33] and a negative relationship between activation of the anterior cingulate cortex (a key node of the attention switching network) and reach to grasp movement time. In one example embodiment, known group differences on reactive control during gait perturbations are assessed between the two groups in order to validate the MOBAL walkway.

In an example embodiment, 5 older (65-80 yrs), male and female community dwelling adults are recruited with FoF (FES-I score 23-64) and 5 young, healthy adults (18-30 yrs),[34] meeting the inclusion/exclusion criteria. 5 physical therapists were also recruited with >5 yrs clinical experience treating balance disorders to provide subjective feedback on the walkway. For this validation study, a power calculation was not conducted.

In an example embodiment, participants will be asked to walk the length of the MOBAL walkway and to respond naturally to any balance perturbation that may occur due to module fixed or movable obstacles. To reduce anticipation, perturbations (movable and fixed module obstacles) will be randomly interspersed with no perturbation trials. In an example embodiment, the following conditions will be randomly administered: Condition 1—Unexpected slip (e.g., slip module 106); Condition 2—Unexpected trip with and without secondary cognitive task (e.g., slip module 106 with and without secondary cognitive task); Condition 3—Unexpected drop 1 step prior to expected 'step over' obstacle (e.g., slip module 106 followed by step over module 102); Condition 4—Expected obstacles (e.g., step over module 102, step around module 113, foam module 114, step down or step over modules 110, 102) at usual and fast pace.

In this example embodiment, during Condition 1 (7 test trials), group differences are assessed on 'first trial effects' (e.g., responses to first novel perturbation exposure) and habituation (e.g., differences in responses between trial 1 and 7) to repeated exposure of the same perturbation. Also, in some example embodiments, no-perturbation trials (e.g. trials with no module obstacles) will be randomly interspersed.

In an example embodiment, during Condition 2 (2 test trials), group differences are assessed on the influence of a secondary mental arithmetic task to balance responses. In this example embodiment, all participants will undergo 1 'practice' no secondary task trip trial and 2 test trials. The location of the tripping device (e.g. trip module 108) will be different for each of the test trials and half of participants will undergo no cognitive task trial first. The other half will undergo the cognitive task trial first. In some example embodiments, four additional, no-perturbation trials (e.g. trials with no module obstacles) with and without cognitive tasks will be randomly interspersed.

In an example embodiment, during Condition 3 (1 test trial), "first trial" group differences are assessed on the online ability to modulate a preplanned obstacle step over strategy after a drop perturbation as might occur with an uneven sidewalk or pot hole. In some example embodiments, one trial will include only the expected obstacle (e.g. fixed obstacle modules), followed by 1 trial with expected and unexpected obstacles (e.g. walkway with fixed and movable obstacle modules).

In an example embodiment, during Condition 4 (4 test trials), group differences in modulation of spatiotemporal gait parameters and gait speed at usual (2 trials) and fast (2 trials) speeds while negotiating several expected obstacles will be assessed.

In an example embodiment, these trials resulted in the following outcomes. A trial is classified as a fall if the average harness load cell (e.g. sensor 120) force exceeds 30% body weight over any 1 second period after perturbation onset (e.g. after the movable obstacle moving to the second position).[35] The number of falls will be tallied across all experimental conditions/trials (e.g. 14 test trials total) for each participant. In an example embodiment, scores and comments on the questionnaire include one or more of ecological validity, harness comfort, safety, ease of use, and weight of the MOBAL walkway, which will be assessed.

In an example embodiment, body segment angular displacement is also assessed over these trials. In an example embodiment, these body segment angular displacements are evaluated for conditions 1-3. In an example embodiment, using kinematic data from a VICON motion capture system (e.g. sensor 122), a 5 segment model will be created of the trunk, thigh, shank, foot, and upper arm. In this example embodiment, peak angular displacements of each segment will be determined (e.g. by the controller 190 based on sensor 122 data) in the sagittal and frontal planes as the greatest change from movement onset (+/−2SD above baseline) to a certain time period (e.g. 1000 milliseconds or ms) after perturbation onset.

In another example embodiment, stepping stability is also assessed during conditions 1-3. In this example embodiment, dynamic stability of the first foot touch down after perturbation will be calculated as the margin of stability in the anterior-posterior and medio-lateral directions.[36] In an example embodiment, the presence of limb collisions will also be determined.

In another example embodiment, usual and fast gait speed and gait parameters are also assessed during condition 4. In an example embodiment, the mean gait speed for two usual and two fast gait speed trials will be determined during expected obstacle negotiation. In these example embodiments, spatiotemporal gait parameters including one or more of step length, step width, and cadence measured at heel strike will be determined during the 2 steps prior to each expected obstacle. In this example embodiment, kinematic measures will be compared with established outcomes (e.g. video analysis, inertial motion capture sensors, etc.).

In another example embodiment, statistical analysis of the generated data from these trials is now discussed. In one example embodiment, for the primary outcome of number of trials with falls, a chi-square test will be used to explore associations between group (FoF, young) and fall outcomes (fall, harness assist, recovery). For all secondary experimental outcomes on body segment displacement, stepping stability, and gait speed, repeated measures of analysis of variances (ANOVAs) will be used to test for the following between group (FoF, young) differences. For condition 1, group x trial (trial 1 vs. 7) will determine differences in first trial effects and habituation. For condition 2, group x task (cognitive vs. no cognitive) will determine differences in the influence of cognition. For condition 3, group x trial (expected vs. expected plus unexpected obstacle) will determine differences in the online ability to modulate responses. For condition 4, group x gait speed (usual vs. fast) will be assessed. For these example embodiments, the significance will be set at alpha 0.05.

In another example embodiment, overall results will validate the MOBAL walkway and associated outcomes as a means to differentiate balance responses between two known groups under conditions that mimic real world falls. Results will also allow a better understanding of the factors that underlie the direct link between FoF and future falls.

In another example embodiment, the preliminary data supports the hypotheses previously discussed herein. However, in some embodiments, elements of the walkway can be reconsidered and/or modified or other outcomes could be looked at, including a comparison of within group changes from less to more anxiety-provoking challenges.

4. HARDWARE OVERVIEW

FIG. 6 is a block diagram that illustrates a computer system 600 upon which an embodiment of the invention may be implemented. Computer system 600 includes a communication mechanism such as a bus 610 for passing information between other internal and external components of the computer system 600. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 600, or a portion thereof, constitutes a means for performing one or more steps of one or more methods described herein.

A sequence of binary digits constitutes digital data that is used to represent a number or code for a character. A bus 610 includes many parallel conductors of information so that information is transferred quickly among devices coupled to the bus 610. One or more processors 602 for processing information are coupled with the bus 610. A processor 602 performs a set of operations on information. The set of operations include bringing information in from the bus 610 and placing information on the bus 610. The set of operations also typically include comparing two or more units of information, shifting positions of units of information, and combining two or more units of information, such as by addition or multiplication. A sequence of operations to be executed by the processor 602 constitutes computer instructions.

Computer system 600 also includes a memory 604 coupled to bus 610. The memory 604, such as a random access memory (RAM) or other dynamic storage device, stores information including computer instructions. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of computer instructions. The computer system 600 also includes a read only memory (ROM) 606 or other static storage device coupled to the bus 610 for storing static information, including instructions, that is not changed by the computer system 600. Also coupled to bus 610 is a non-volatile (persistent) storage device 608, such as a magnetic disk or optical disk, for storing information, including instructions, that persists even when the computer system 600 is turned off or otherwise loses power.

Information, including instructions, is provided to the bus 610 for use by the processor from an external input device 612, such as a keyboard containing alphanumeric keys operated by a human user, or a sensor. A sensor detects conditions in its vicinity and transforms those detections into signals compatible with the signals used to represent information in computer system 600. Other external devices coupled to bus 610, used primarily for interacting with humans, include a display device 614, such as a cathode ray tube (CRT) or a liquid crystal display (LCD), for presenting images, and a pointing device 616, such as a mouse or a trackball or cursor direction keys, for controlling a position of a small cursor image presented on the display 614 and issuing commands associated with graphical elements presented on the display 614.

In the illustrated embodiment, special purpose hardware, such as an application specific integrated circuit (IC) 620, is coupled to bus 610. The special purpose hardware is configured to perform operations not performed by processor 602 quickly enough for special purposes. Examples of application specific ICs include graphics accelerator cards for generating images for display 614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 600 also includes one or more instances of a communications interface 670 coupled to bus 610. Communication interface 670 provides a two-way communication coupling to a variety of external devices that operate with their own processors, such as printers, scanners and external disks. In general the coupling is with a network link 678 that is connected to a local network 680 to which a variety of external devices with their own processors are connected. For example, communication interface 670 may be a parallel port or a serial port or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. Carrier waves, such as acoustic waves and electromagnetic waves, including radio, optical and infrared waves travel through space without wires or cables. Signals include man-made variations in amplitude, frequency, phase, polarization or other physical properties of carrier waves. For wireless links, the communications interface 670 sends and receives electrical, acoustic or electromagnetic signals, including infrared and optical signals, that carry information streams, such as digital data.

The term computer-readable medium is used herein to refer to any medium that participates in providing information to processor 602, including instructions for execution. Such a medium may take many forms, including, but not limited to, non-volatile media, volatile media and transmission media. Non-volatile media include, for example, optical or magnetic disks, such as storage device 608. Volatile media include, for example, dynamic memory 604. Transmission media include, for example, coaxial cables, copper wire, fiber optic cables, and waves that travel through space without wires or cables, such as acoustic waves and electromagnetic waves, including radio, optical and infrared waves. The term computer-readable storage medium is used herein to refer to any medium that participates in providing information to processor 602, except for transmission media.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read. The term non-transitory computer-readable storage medium is used herein to refer to any medium that participates in providing information to processor 602, except for carrier waves and other signals.

Logic encoded in one or more tangible media includes one or both of processor instructions on a computer-readable storage media and special purpose hardware, such as ASIC *620.

Network link 678 typically provides information communication through one or more networks to other devices that use or process the information. For example, network link 678 may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690. A computer called a server 692 connected to the Internet provides a service in response to information received over the Internet. For example, server 692 provides information representing video data for presentation at display 614.

The invention is related to the use of computer system 600 for implementing the techniques described herein. According to one embodiment of the invention, those techniques are performed by computer system 600 in response to processor 602 executing one or more sequences of one or more instructions contained in memory 604. Such instructions, also called software and program code, may be read into memory 604 from another computer-readable medium such as storage device 608. Execution of the sequences of instructions contained in memory 604 causes processor 602 to perform the method steps described herein. In alternative embodiments, hardware, such as application specific integrated circuit 620, may be used in place of or in combination with software to implement the invention. Thus, embodiments of the invention are not limited to any specific combination of hardware and software.

The signals transmitted over network link 678 and other networks through communications interface 670, carry information to and from computer system 600. Computer system 600 can send and receive information, including program code, through the networks 680, 690 among others, through network link 678 and communications interface 670. In an example using the Internet 690, a server 692 transmits program code for a particular application, requested by a message sent from computer 600, through Internet 690, ISP equipment 684, local network 680 and communications interface 670. The received code may be executed by processor 602 as it is received, or may be stored in storage device 608 or other non-volatile storage for later execution, or both. In this manner, computer system 600 may obtain application program code in the form of a signal on a carrier wave.

Various forms of computer readable media may be involved in carrying one or more sequence of instructions or data or both to processor 602 for execution. For example, instructions and data may initially be carried on a magnetic disk of a remote computer such as host 682. The remote computer loads the instructions and data into its dynamic memory and sends the instructions and data over a telephone line using a modem. A modem local to the computer system 600 receives the instructions and data on a telephone line and uses an infra-red transmitter to convert the instructions and data to a signal on an infra-red a carrier wave serving as the network link 678. An infrared detector serving as communications interface 670 receives the instructions and data carried in the infrared signal and places information representing the instructions and data onto bus 610. Bus 610 carries the information to memory 604 from which processor 602 retrieves and executes the instructions using some of the data sent with the instructions. The instructions and data received in memory 604 may optionally be stored on storage device 608, either before or after execution by the processor 602.

FIG. 7 illustrates a chip set 700 upon which an embodiment of the invention may be implemented. Chip set 700 is programmed to perform one or more steps of a method described herein and includes, for instance, the processor and memory components described with respect to FIG. *6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 700, or a portion thereof, constitutes a means for performing one or more steps of a method described herein.

In one embodiment, the chip set 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform one or more steps of a method described herein. The memory 705 also stores the data associated with or generated by the execution of one or more steps of the methods described herein.

5. ALTERNATIVES, DEVIATIONS AND MODIFICATIONS

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. Throughout this specification and the claims, unless the context requires otherwise, the word "comprise" and its variations, such as "comprises" and "comprising," will be understood to imply the inclusion of a stated item, element or step or group of items, elements or steps but not the exclusion of any other item, element or step or group of items, elements or steps. Furthermore, the indefinite article "a" or "an" is meant to indicate one or more of the item, element or step modified by the article.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements at the time of this writing. Furthermore, unless otherwise clear from the context, a numerical value presented herein has an implied precision given by the least significant digit. Thus, a value 1.1 implies a value from 1.05 to 1.15. The term "about" is used to indicate a broader range centered on the given value, and unless otherwise clear from the context implies a broader range around the least significant digit, such as "about 1.1" implies a range from 1.0 to 1.2. If the least significant digit is unclear, then the term "about" implies a factor of two, e.g., "about X" implies a value in the range from 0.5X to 2X, for example, about 100 implies a value in a range from 50 to 200. Moreover, all ranges disclosed herein are to be understood to encompass any and all sub-ranges subsumed therein. For example, a range of "less than 10" for a positive only parameter can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

6. REFERENCES

1. Delbaere K, Close J C T, Brodaty H, Sachdev P, Lord S R. Determinants of disparities between perceived and physiological risk of falling among elderly people: cohort study. *BMJ*. 2010; 341: c4165. doi: 10.1136/bmj.
2. Murphy S L, Williams C S, Gill T M. Characteristics Associated with Fear of Falling and Activity Restriction in Community-Living Older Persons. *J Am Geriatr Soc*. 2002; 50 (3): 516-520. doi: 10.1046/j.1532-5415.2002.50119.x
3. Delbaere K, Crombez G, Vanderstraeten G, Willems T, Cambier D. Fear-related avoidance of activities, falls and physical frailty. A prospective community-based cohort study. *Age Ageing*. 2004; 33 (4): 368-373. doi: 10.1093/ageing/afh106
4. Adkin A L, Frank J S, Carpenter M G, Peysar G W. Postural control is scaled to level of postural threat. *Gait Posture*. 2000; 12 (2): 87-93. doi: 10.1016/S0966-6362 (00) 00057-6
5. Cleworth T W, Horslen B C, Carpenter M G. Influence of real and virtual heights on standing balance. *Gait Posture*. 2012; 36 (2): 172-176. doi: 10.1016/j.gaitpost.2012.02.010
6. Carpenter M G, Frank J S, Silcher C P. Surface height effects on postural control: a hypothesis for a stiffness strategy for stance. *J Vestib Res*. 1999; 9 (4): 277-286. http://www.ncbi.nlm.nih.gov/pubmed/10472040. Accessed May 13, 2019.
7. Allum J H J, Tang K-S, Carpenter M G, Oude Nijhuis L B, Bloem B R. Review of first trial responses in balance control: Influence of vestibular loss and Parkinson's disease. *Hum Mov Sci*. 2011; 30 (2): 279-295. doi: 10.1016/j.humov.2010.11.009
8. Eysenck M W, Derakshan N, Santos R, Calvo M G. Anxiety and cognitive performance: attentional control theory. *Emotion*. 2007; 7 (2): 336-353. doi: 10.1037/1528-3542.7.2.336
9. Eysenck M W, Calvo M G. Anxiety and Performance: The Processing Efficiency Theory. *Cogn Emot*. 1992; 6 (6): 409-434. doi: 10.1080/02699939208409696
10. Brown L A, White P, Doan J B, de Bruin N. Selective Attentional Processing to Fall-Relevant Stimuli Among Older Adults Who Fear Falling. *Exp Aging Res*. 2011; 37 (3): 330-345. doi: 10.1080/0361073X.2011.568833
11. Gage W H, Sleik R J, Polych M A, Mckenzie N C, Brown L A. The allocation of attention during locomotion is altered by anxiety. *Exp Brain Res*. 2003; 150 (3): 385-394. doi: 10.1007/s00221-003-1468-7
12. Westlake K P, Culham E G. Sensory-Specific Balance Training in Older Adults: Effect on Proprioceptive Reintegration and Cognitive Demands. *Phys Ther*. 2007; 87 (10): 1274-1283. doi: 10.2522/ptj.20060263
13. Westlake K, Culham E. The effect of activity level on proprioception, postural sway, and fear of falling in older adults. *J Aging Phys Act*. 2004; 12 (3): 268.
14. Older Adult Falls-Important Facts about Falls, Home and Recreational Safety, CDC. https://www.cdc.gov/homeandrecreationalsafety/falls/adultfalls.html. Accessed May 26, 2019.
15. Lach H W. Incidence and Risk Factors for Developing Fear of Falling in Older Adults. *Public Health Nurs*. 2005; 22 (1): 45-52. doi: 10.1111/j.0737-1209.2005.22107.x
16. van Schooten K S, Freiberger E, Smitt M S, et al. Concern About Falling Is Associated With Gait Speed, Independently From Physical and Cognitive Function. *Phys Ther*. March 2019. doi: 10.1093/ptj/pzz032
17. Murphy J, Isaacs B. The Post-Fall Syndrome. *Gerontology*. 1982; 28 (4): 265-270. doi: 10.1159/000212543
18. Bhala R P, O'Donnell J, Thoppil E. Ptophobia. *Phys Ther*. 1982; 62 (2): 187-190. doi: 10.1093/ptj/62.2.187
19. Maki B E. Gait changes in older adults: predictors of falls or indicators of fear. *J Am Geriatr Soc*. 1997; 45 (3): 313-320. http://www.ncbi.nlm.nih.gov/pubmed/9063277. Accessed May 27, 2019.
20. Winter D A, Patla A E, Frank J S, Walt S E. Biomechanical Walking Pattern Changes in the Fit and Healthy Elderly. *Phys Ther*. 1990; 70 (6): 340-347. doi: 10.1093/ptj/70.6.340
21. Westlake K P, Culham E G. Sensory-specific balance training in older adults: Effect on proprioceptive reintegration and cognitive demands. *Phys Ther*. 2007; 87 (10). doi: 10.2522/ptj.20060263
22. Landis C, Hunt W. *The Startle Pattern*. Oxford, England: Farrar & Rinehart; 1939.
23. Sanders O P, Hsiao H Y, Savin D N, Creath R A, Rogers M W. Aging changes in protective balance and startle responses to sudden drop-perturbations. *J Neurophysiol*. April 2019: jn.00431.2018. doi: 10.1152/jn.00431.2018
24. Bisdorff A R, Bronstein A M, Gresty M A, Wolsley C J, Vies A Da, Young A. EMG-responses to Sudden Onset Free Fall. *Acta Otolaryngol*. 1995; 115 (sup520): 347-349. doi: 10.3109/00016489509125267
25. Uemura K, Yamada M, Nagai K, Tanaka B, Mori S, Ichihashi N. Fear of falling is associated with prolonged anticipatory postural adjustment during gait initiation under dual-task conditions in older adults. *Gait Posture.* 2012; 35 (2): 282-286. doi: 10.1016/J.GAITPOST.2011.09.100
26. van Schooten K S, Freiberger E, Smitt M S, et al. Concern About Falling Is Associated With Gait Speed, Independently From Physical and Cognitive Function. *Phys Ther.* March 2019. doi: 10.1093/ptj/pzz032
27. McIlroy W E, Maki B E. Early activation of arm muscles follows external perturbation of upright stance. *Neurosci Lett.* 1995; 184 (3): 177-180. doi: 10.1016/0304-3940 (94) 11200-3
28. King E C, Lee T A, McKay S M, et al. Does the "eyes lead the hand" principle apply to reach-to-grasp movements evoked by unexpected balance perturbations? *Hum Mov Sci.* 2011; 30 (2): 368-383. doi: 10.1016/j.humov.2010.07.005
29. Cona G, Bisiacchi P S, Amodio P, Schiff S. Age-related decline in attentional shifting: Evidence from ERPs. *Neurosci Lett.* 2013; 556:129-134. doi: 10.1016/j.neulet.2013.10.008
30. Perry S D, McIlroy W E, Maki B E. *The Role of Plantar Cutaneous Mechanoreceptors in the Control of Compensatory Stepping Reactions Evoked by Unpredictable, Multi-Directional Perturbation.* Vol 877; 2000. doi: 10.1016/S0006-8993(00)02712-8
31. Kumar A, Delbaere K, Zijlstra G A R, et al. Exercise for reducing fear of falling in older people living in the community: Cochrane systematic review and meta-analysis. *Age Ageing.* 2016; 45 (3): 345-352. doi: 10.1093/ageing/afw036
32. Wang Y, Bhatt T, Liu X, et al. Can treadmill-slip perturbation training reduce immediate risk of overground-slip induced fall among community-dwelling older adults? *J Biomech.* 2019; 84:58-66. doi: 10.1016/j.jbiomech.2018.12.017
33. Westlake K P, Johnson B P, Creath R A, Neff R M, Rogers M W. Influence of non-spatial working memory demands on reach-grasp responses to loss of balance: Effects of age and fall risk. *Gait Posture.* 2016; 45:51-55. doi: 10.1016/j.gaitpost.2016.01.007
34. Delbaere K, Close J C T, Mikolaizak A S, Sachdev P S, Brodaty H, Lord S R. The Falls Efficacy Scale International (FES-I). A comprehensive longitudinal validation study. *Age Ageing.* 2010; 39 (2): 210-216. doi: 10.1093/ageing/afp225
35. Yang F, Pai Y-C. Automatic recognition of falls in gait-slip training: Harness load cell based criteria. *J Biomech.* 2011; 44:2243-2249. doi: 10.1016/j.jbiomech.2011.05.039
36. Madehkhaksar F, Klenk J, Sczuka K, Gordt K, Melzer I, Schwenk M. The effects of unexpected mechanical perturbations during treadmill walking on spatiotemporal gait parameters, and the dynamic stability measures by which to quantify postural response. Haddad J M, ed. *PLOS One.* 2018; 13 (4): e0195902. doi: 10.1371/journal.pone.0195902

What is claimed is:
1. An apparatus comprising:
a plurality of modules detachably coupled together to form a walkway, wherein each module comprises an obstacle;
wherein the obstacle of at least one of the modules is a movable obstacle configured to move from a first position to a second position; and
wherein the obstacle of at least one of the modules is a fixed obstacle in a fixed position.

2. An apparatus as recited in claim 1, further comprising respective latches positioned between each adjacent pair of modules of the plurality of modules such that the plurality of modules are detachably coupled together with the respective latches.

3. An apparatus as recited in claim 2, wherein the respective latches comprise bolt latches, spring latches, toggle latches or hook and eye latches.

4. An apparatus as recited in claim 1, wherein the movable obstacle is configured to move from the first position to the second position based on a force imparted on the at least one module.

5. An apparatus as recited in claim 4, wherein the at least one module is a slip module and wherein the movable obstacle is a surface of the slip module configured to move from the first position to the second position in a first direction along the walkway based on the force imparted on the slip module in the first direction.

6. An apparatus as recited in claim 4, wherein the at least one module is a drop module and wherein the movable obstacle is a surface of the drop module configured to move from the first position to the second position in a second direction orthogonal to a first direction along the walkway based on the force imparted on the drop module in the second direction.

7. An apparatus as recited in claim 1, wherein the at least one module is a trip module and wherein the movable obstacle is a step of the trip module configured to move from the first position oriented at a first direction along the walkway to the second position oriented at an angle relative to the first direction.

8. An apparatus as recited in claim 1, wherein the fixed obstacle of the at least one module comprises a step that extends above a surface of adjacent modules along the walkway.

9. An apparatus as recited in claim 1, wherein the fixed obstacle is an uneven surface.

10. An apparatus as recited in claim 1, wherein the at least one module is a step down module and the fixed obstacle of the step down module defines a cavity that extends below a surface of adjacent modules along the walkway.

11. An apparatus as recited in claim 1, further comprising handrail latches along a portion of the walkway such that a handrail is configured to be attached to the handrail latches.

12. An apparatus as recited in claim 1, further comprising a plurality of wheels attached to the walkway such that the walkway is configured to move over a floor surface with the plurality of wheels.

13. An apparatus as recited in claim 1, comprising at least two of:
a slip module and wherein the movable obstacle is a surface of the slip module configured to move from the first position to the second position in a first direction along the walkway based on a force imparted on the slip module in the first direction;
a drop module and wherein the movable obstacle is a surface of the drop module configured to move from the first position to the second position in a second direction orthogonal to the first direction based on a force imparted on the drop module in the second direction; and
a trip module and wherein the movable obstacle is a step of the trip module configured to move from the first position oriented at the first direction along the walkway to the second position oriented at an angle relative to the first direction.

14. An apparatus as recited in claim 1, comprising at least two of:
   a step over module wherein the fixed obstacle comprises a step that extends above a surface of adjacent modules along the walkway;
   an uneven surface module wherein the fixed obstacle comprises an uneven surface; and
   a step down module wherein the fixed obstacle defines a cavity that extends below a surface of adjacent modules along the walkway.

15. An apparatus as recited in claim 1, comprising:
   a slip module and wherein the movable obstacle is a surface of the slip module configured to move from the first position to the second position in a first direction along the walkway based on a force imparted on the slip module in the first direction;
   a drop module and wherein the movable obstacle is a surface of the drop module configured to move from the first position to the second position in a second direction orthogonal to the first direction based on a force imparted on the drop module in the second direction;
   a trip module and wherein the movable obstacle is a step of the trip module configured to move from the first position oriented at the first direction along the walkway to the second position oriented at an angle relative to the first direction;
   a step over module wherein the fixed obstacle comprises a step that extends above a surface of adjacent modules along the walkway;
   an uneven surface module wherein the fixed obstacle comprises an uneven surface; and
   a step down module wherein the fixed obstacle defines a cavity that extends below a surface of adjacent modules along the walkway.

16. A system comprising:
   the apparatus of claim 1;
   a sensor configured to measure a value of a parameter indicating a characteristic of motion of a subject over the walkway;
   at least one processor; and
   at least one memory including one or more sequences of instructions,
   the at least one memory and the one or more sequences of instructions configured to, with the at least one processor, cause the system to perform at least the following,
      receive the value of the parameter indicating the characteristic of motion of the subject based on navigation of each obstacle of each module along the walkway; and
      store the value of the parameter in the memory.

17. A system as recited in claim 16, wherein the sensor comprises a camera configured to capture image data indicating the characteristic of motion of the subject.

18. A system as recited in claim 16, further comprising a harness attached to the subject and supported by a line anchored at both ends of the walkway, wherein the sensor is operatively attached to the harness and is configured to measure a force imparted on the harness by the subject.

19. A system as recited in claim 18, wherein the sensor is a load cell.

20. A system as recited in claim 16, wherein the sensor comprises an inertial motion capture unit configured to measure kinematics of one or more limbs of the subject during navigation of each obstacle of each module.

* * * * *